US007852202B2

(12) United States Patent
Miake et al.

(10) Patent No.: US 7,852,202 B2
(45) Date of Patent: Dec. 14, 2010

(54) DISPLAY SYSTEM, DISPLAY DEVICE, DISPLAY PROGRAM, DISPLAY METHOD, AND COMPUTER-READABLE STORAGE MEMORY CONTAINING THE DISPLAY PROGRAM

(75) Inventors: Aki Miake, Nara (JP); Hiroyuki Yamada, Kawachinagano (JP)

(73) Assignee: Sharp Kabushiki Kaisha, Osaka (JP)

( * ) Notice: Subject to any disclaimer, the term of this patent is extended or adjusted under 35 U.S.C. 154(b) by 280 days.

(21) Appl. No.: 12/088,263

(22) PCT Filed: Jun. 20, 2006

(86) PCT No.: PCT/JP2006/312333

§ 371 (c)(1), (2), (4) Date: Mar. 27, 2008

(87) PCT Pub. No.: WO2007/037050

PCT Pub. Date: Apr. 5, 2007

(65) Prior Publication Data

US 2009/0115592 A1 May 7, 2009

(30) Foreign Application Priority Data

Sep. 28, 2005 (JP) ............................ 2005-282478

(51) Int. Cl.
*B60Q 1/00* (2006.01)
*G08B 25/00* (2006.01)
*G06F 7/00* (2006.01)

(52) U.S. Cl. ....................... 340/459; 340/461; 340/462; 340/525; 701/29; 701/34

(58) Field of Classification Search ................. 340/459, 340/461, 462, 525
See application file for complete search history.

(56) References Cited

U.S. PATENT DOCUMENTS

| | | | | |
|---|---|---|---|---|
| 5,189,394 | A * | 2/1993 | Walter et al. | 340/525 |
| 5,287,390 | A * | 2/1994 | Scarola et al. | 376/216 |
| 5,491,631 | A * | 2/1996 | Shirane et al. | 701/35 |
| 2004/0196273 | A1 | 10/2004 | Mitsumura et al. | |

FOREIGN PATENT DOCUMENTS

| | | | |
|---|---|---|---|
| JP | 06-289805 | A | 10/1994 |
| JP | 10-129300 | A | 5/1998 |
| JP | 2000-089738 | A | 3/2000 |
| JP | 2000-310982 | A | 11/2000 |
| JP | 2004-157368 | A | 6/2004 |
| JP | 2004-249836 | A | 9/2004 |

OTHER PUBLICATIONS

Official Communication for PCT Application No. PCT/JP2006/312333; mailed Jul. 25, 2006.

* cited by examiner

*Primary Examiner*—Donnie L Crosland
(74) *Attorney, Agent, or Firm*—Keating & Bennett, LLP

(57) ABSTRACT

A display system includes a display device mounted on a vehicle, and a controller arranged to control the display of a plurality of pieces of information regarding the vehicle as an image in the display device. If a display fault occurs in a portion of the display device, the controller performs control to display the information displayed in the display fault area having had the display fault, in a normal display area performing a normal display.

13 Claims, 8 Drawing Sheets

BLOCK DIAGRAM SHOWING THE CONFIGURATION OF AN IMAGE OUTPUT CONTROL SECTION

FIG.1 BLOCK DIAGRAM SHOWING THE CONFIGURATION OF AN IMAGE OUTPUT CONTROL SECTION
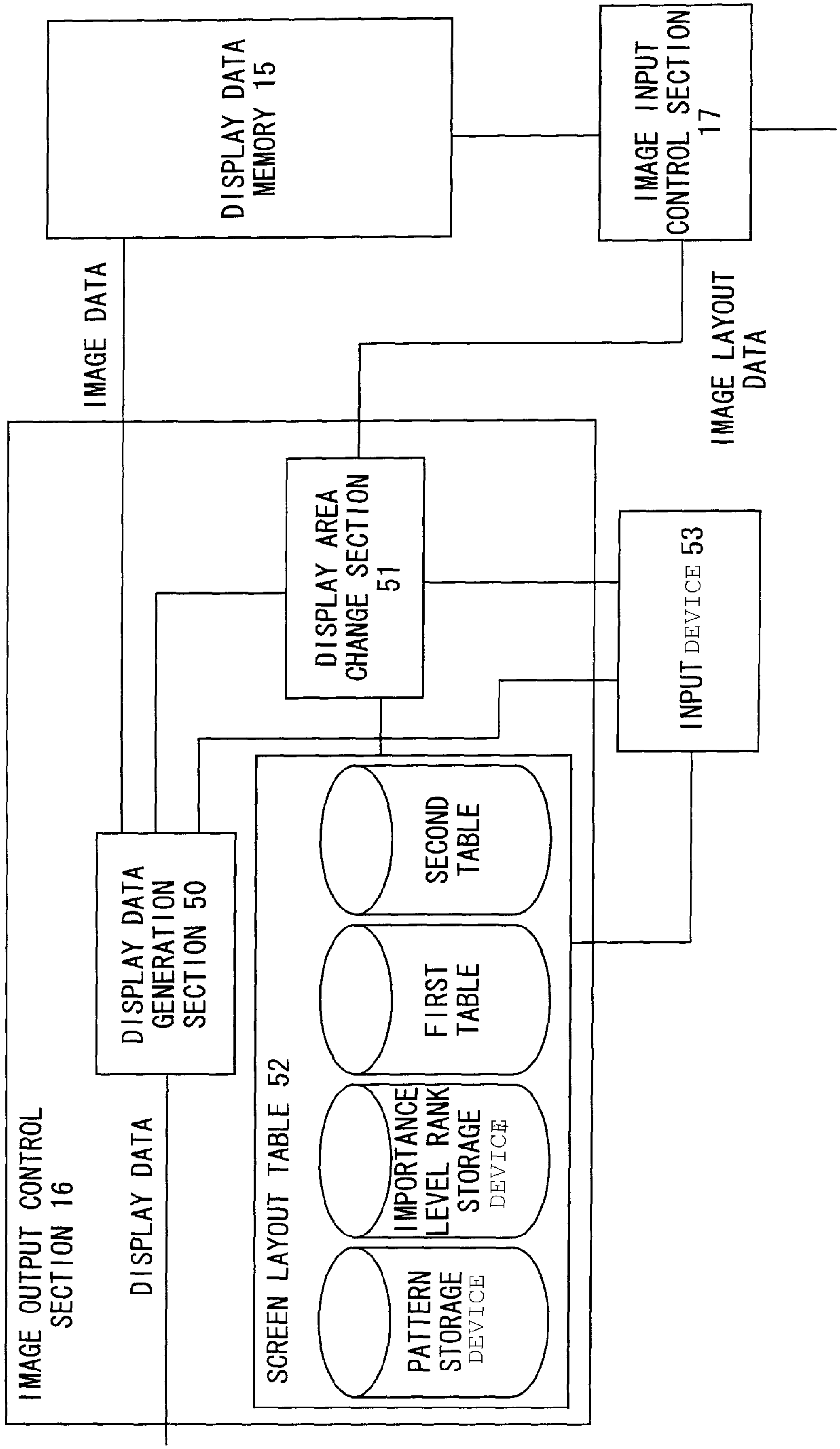

FIG.2 BLOCK DIAGRAM SHOWING AN INSTRUMENTAL PANEL DISPLAY SYSTEM
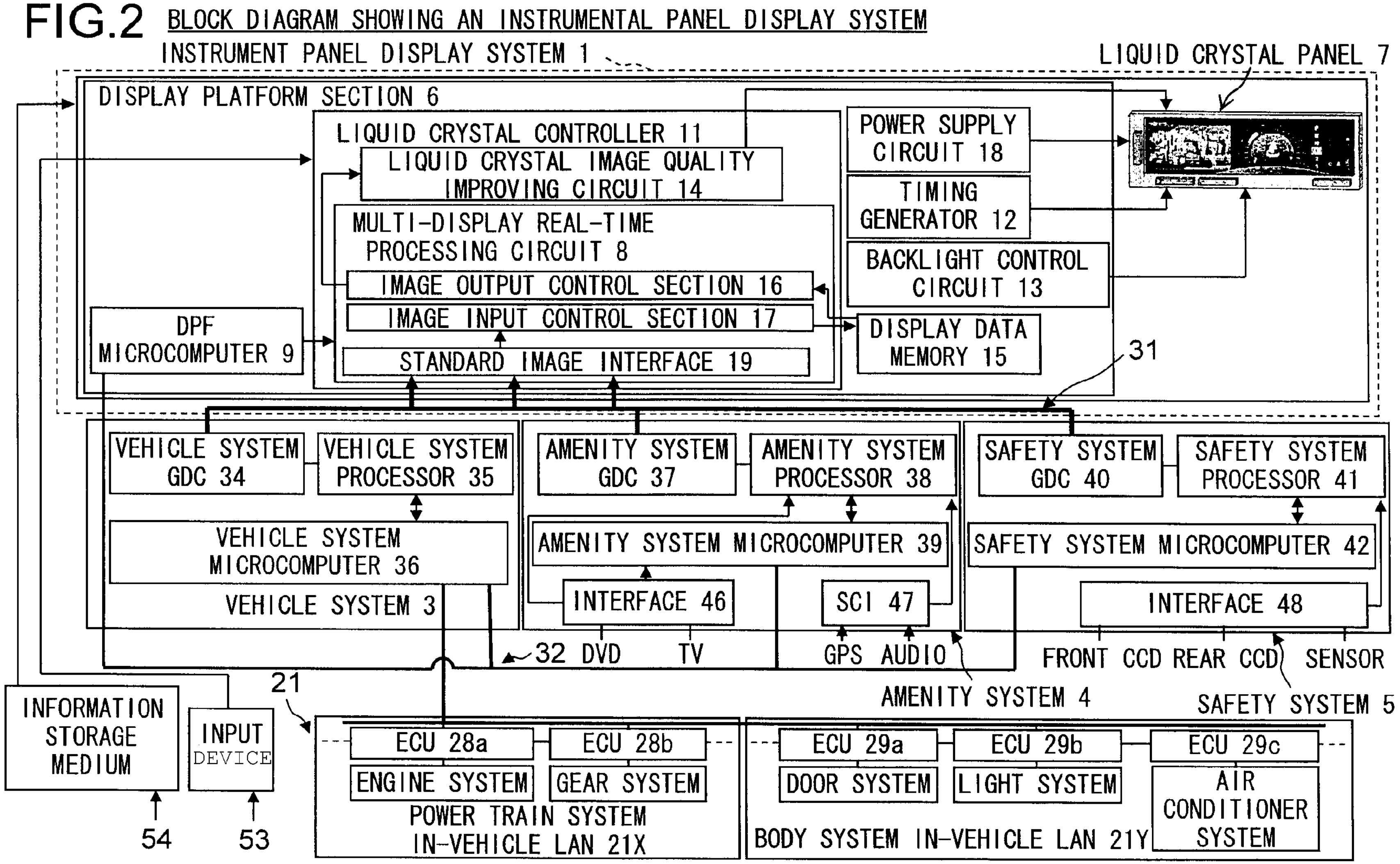

FIG.3-1 FLOW OF DISPLAY DATA DISPLAY
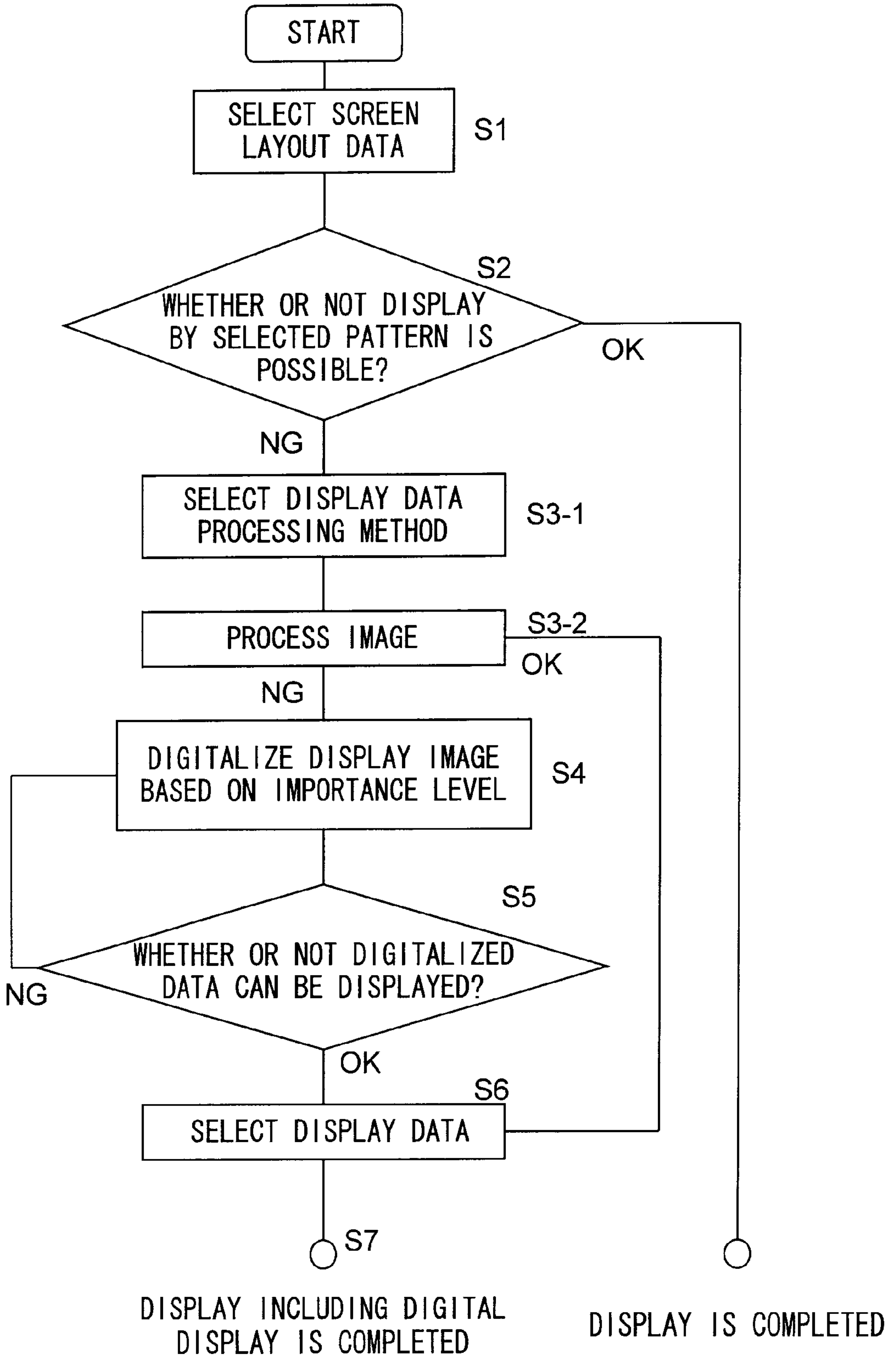

FIG.3-2 FLOW OF DISPLAY DATA PROCESSING
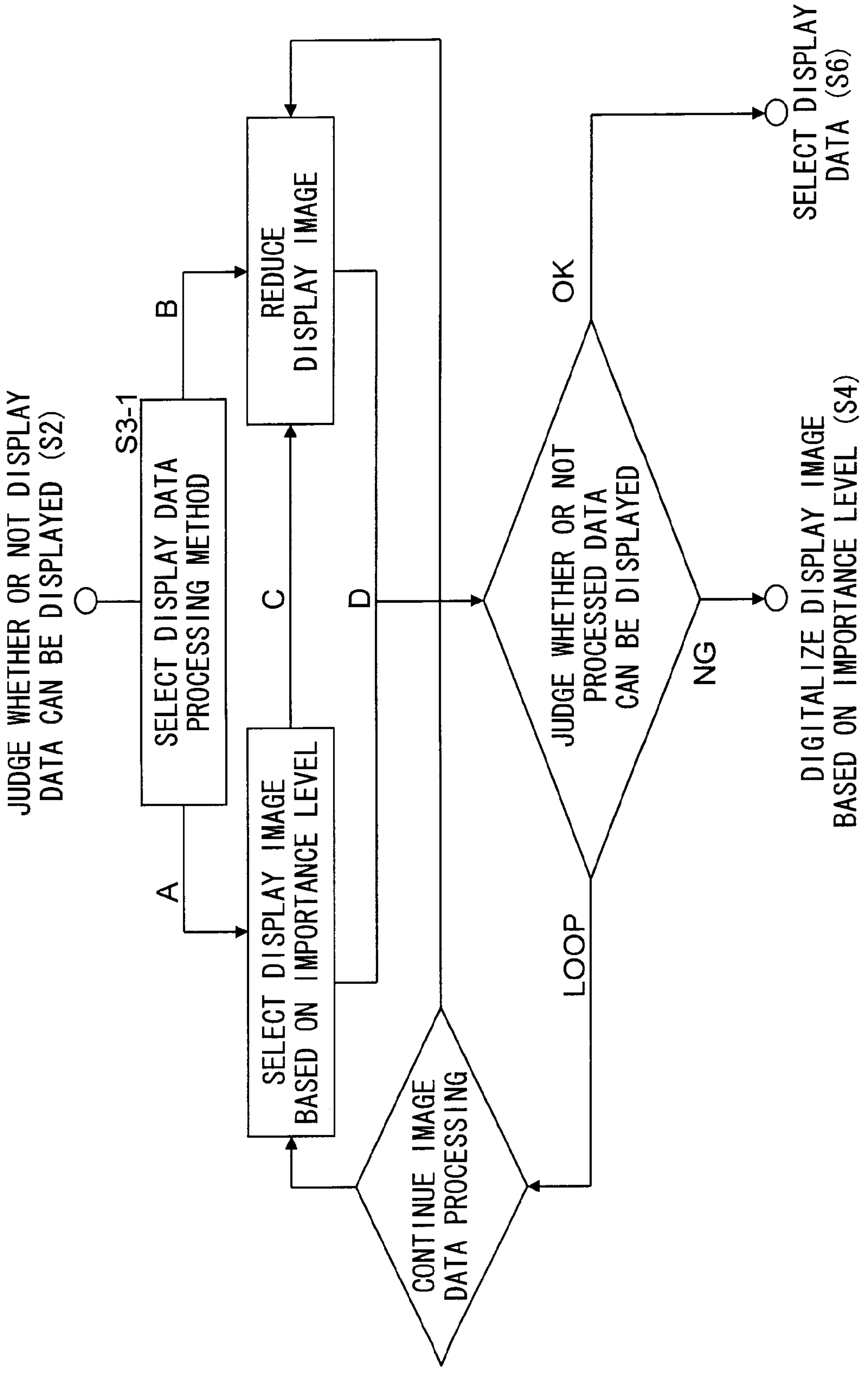

EXAMPLES OF DISPLAY

EXAMPLES OF DISPLAY

EXAMPLES OF DISPLAY

FIG.7 FLOW OF SCREEN LAYOUTTABLE CUSTOMIZATION
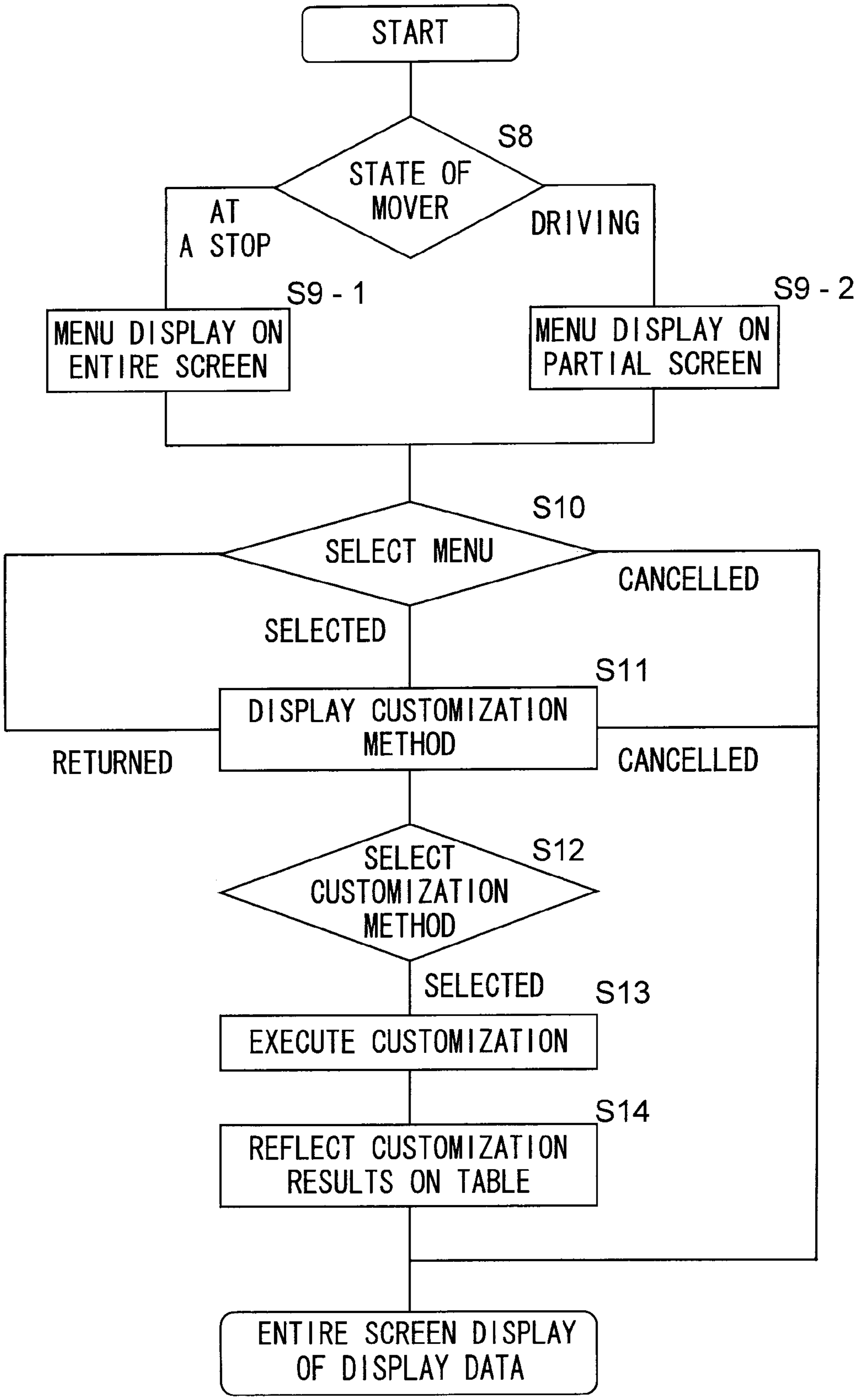

DISPLAY SYSTEM, DISPLAY DEVICE, DISPLAY PROGRAM, DISPLAY METHOD, AND COMPUTER-READABLE STORAGE MEMORY CONTAINING THE DISPLAY PROGRAM

SUMMARY OF THE INVENTION

1. Field of the Invention

The present invention relates to a display device or a display system for use in a vehicle such as an automobile, a train, an aircraft or other type of vessel.

2. Description of the Related Art

In recent years, a vehicle display device has been suggested which displays vehicle state information such as vehicle speed, engine speed, etc., and additional information such as a navigation image, etc., for aiding driving (see, for example, JP-A-H10-129300). As shown in FIG. 5, an automobile described in JP-A-H10-129300 is loaded with a vehicle display device 61, a display device 62, and a display device 63. The vehicle display devices respectively include: liquid crystal panels 64, 65, and 66; light sources 67, 68, and 69; photo sensors 70, 71, and 72; and switch means 73, 74, and 75.

The switch means 73, 74, and 75 each include a switch terminal and an input terminal. Emitting states of the light sources 67, 68, and 69 are detected by the photo sensors 70, 71, and 72, respectively, and results of the detection are output to a control circuit 76. The control circuit 76 is connected to the switch terminals of the switch means 73, 74, and 75 and also to a screen image unit 77.

The screen image unit 77 outputs information displayed by the vehicle display devices 61, 62, and 63. The screen image unit 77 sets importance levels on the information. The information is ranked with importance level 1 as the highest importance level; importance level 2, or importance level 3 as the lowest importance level. The screen image unit 77 groups output information based on the importance levels.

The control circuit 76, by controlling the switch means 73, 74, and 75, supplies information of the different importance levels to the liquid crystal panels 64, 65, and 66, respectively. To display the information of importance level 1 on the liquid crystal panel 64, the control circuit 76 controls the switch means 73 so that, of the information of the importance levels 1, 2, and 3, only that of importance level 1 is supplied to the liquid crystal panel 64. At this point, the control circuit 76 controls the switch means 74 so that the information of importance level 2 is supplied to the liquid crystal panel 65 by the screen image unit 77, and also controls the switch means 74 so that the information of importance level 3 is supplied to the liquid crystal panel 66 by the screen image unit 77.

When the photo sensor 70 of the vehicle display device 61 displaying the information of importance level 1 detects a fault in the light source, the control circuit 76 controls the switch means 74 so that the information of importance level 1 is displayed on the vehicle display device 62 that has been displaying the information of importance level 2. As a result, the vehicle display device 62, in place of the vehicle display device 61, displays the information of importance level 1. Further, the information of importance level 2 that has been displayed until then by the vehicle display device 62 is displayed by the vehicle display device 63 as a result of control of the switch means 75 by the control circuit 76.

In JP-A-2004-249836, as shown in FIG. 6, an automobile is loaded with vehicle display devices 80, 81, and 82. The vehicle display device 80 includes a liquid crystal panel 83 and a memory storing a program for controlling the liquid crystal panel 83. The vehicle display device 81 includes a liquid crystal panel 84 and a memory storing a program for controlling the liquid crystal panel 84. Further, the vehicle display device 82 includes a head-up display 85 and a memory storing a program for controlling the head-up display 85.

In the event of malfunction of the liquid crystal panel 83 of the vehicle display device 80, the liquid crystal panel 84 of the vehicle display device 81 displays information indicating the malfunction of the vehicle display device 80. Then, a control section 86 displays on the liquid crystal panel 84 information that has been displayed on the liquid crystal panel 83 simultaneously with the information that has been already displayed on the liquid crystal panel 84, thereby displaying information required for the driver in such a manner as not to cause interference with his or her driving.

In JP-A-H10-129300, upon detection of a fault occurring in one of the plurality of vehicle display devices, the information that has been displayed by the vehicle display device detected to have a fault is displayed on the vehicle display device displaying the information of the level lower than that of the aforementioned information to thereby replace the lower-level information. Thus, there arises a problem that every time a fault in the vehicle display device is detected, the display position remarkably changes, resulting in great difficulties in identifying the position at which displaying is being performed. This consequently leads to the possibility of decreasing the driver's attention and safety during driving.

Upon detection of a fault by a sensor included in the vehicle display device, even when it is possible to continue displaying in a normal display area of the display with the fault, the other display device takes over this displaying operation. This leads to the risk of a dramatic decrease in information that can be obtained by the driver.

In JP-A-2004-249836, a vehicle display system having a plurality of vehicle display devices is characterized in that upon detection of a fault in display operation state of a display section of one of the plurality of vehicle display devices, display items that have been displayed by this display section are at least compositely displayed on a screen of another display section. Thus, even when part of the display device with the fault can continue displaying, the display items that have been displayed are compositely displayed on the other display device. Thus, there arises a problem that the display position remarkably changes, resulting in great difficulties in identifying the position at which displaying is being performed. This consequently leads to the risk of decreasing the driver's safety during driving.

SUMMARY OF THE INVENTION

In order to solve the problems described above, preferred embodiments of the present invention provide a display system for a vehicle that operates such that, in the event of a fault occurring in one portion of a display area in a display device displaying as images a plurality of pieces of information including information concerning the vehicle, display in a displayable area in the same display device information displayed in the aforementioned portion.

A display system according to a preferred embodiment of the present invention includes: a display loaded in a vehicle; and a controller performing control so as to display, as an image on the display, a plurality of pieces of information including information about the vehicle. The display system includes a controller performing control so that, in an event of a display fault in a portion of the display, information displayed in a display fault area with the display fault is displayed in a normal display area where normal display is performed.

With the configuration described above, even when a fault in the display loaded in the vehicle is detected, an image in the display fault area can be displayed in the normal display area in the display, and thus can be displayed on the same display.

The display system according to a preferred embodiment of the present invention further includes: a pattern storage device arranged to store a plurality of pieces of screen layout data indicating in what layout the plurality of pieces of information, including the information about the vehicle, are displayed on the display; and an image output control section generating, based on the screen layout data and the image, display data to be displayed on the display. Since the screen layout data is previously stored, the display data generation and display in accordance with a display state of the display can be easily performed.

The display system according to a preferred embodiment of the present invention further includes: an importance level rank storage device arranged to store importance levels for at least two or more of the plurality of pieces of information including the information about the vehicle; and an image output control section, based on ranks stored in the importance level rank storage device, performing control so as to adjust the information to be displayed and display the information in the normal display area.

Thus, when all the information cannot be displayed in the normal display area, the information can be displayed based on the importance level rank at which the information required for the driver's driving is stored, which permits important information to be displayed preferentially so as not to interfere with the driving.

The display system according to a preferred embodiment of the present invention includes: a first table storing information on a smallest visible image size; a second table storing vertical and horizontal deformation ratios for the image; and the image output control section, based on the first and second tables, deforming the image to be displayed on the display.

Thus, deformation of each image can be performed based on the data stored in each of the tables, and when a fault in the display is detected, an image in an optimum size can be efficiently set when displayed in the normal display area.

The display system according to a preferred embodiment of the present invention further includes: a first table storing information on a smallest visible image size when the plurality of pieces of information including the information about the vehicle is displayed as an image; and an image output control section, when the plurality of pieces of information including the information about the vehicle are displayed as an image in an image size equal to or smaller than the image size stored in the first table, performs control so as to display the information with numerical values or characters. Thus, even when the normal display area is small, information required for the driver to maneuver the vehicle can be displayed in a visible manner.

The display system according to a preferred embodiment of the present invention preferably includes a detector arranged to monitor and detect faults in the display fault area. Thus, in the event of a fault in the display fault area, the image output control section can start generation of display data in accordance with the normal display area of the display.

The display system according to a preferred embodiment of the present invention further includes an input device arranged to input the display fault area. Since the display fault area is inputted by the input device, the display fault area can be inputted with accuracy.

A display device according to a preferred embodiment of the prevent invention includes: a display displaying, as an image, a plurality of pieces of information including information about the vehicle; and an image output control section changing an image displayed in a display fault area of the display to a normal display area of the display The display system according to a preferred embodiment of the present invention further includes an input device arranged to perform at least one of: adding screen layout data to the pattern storage device; changing the screen layout data stored in the pattern storage device; and deleting the screen layout data stored in the pattern storage device. Thus, the driver can customize the screen layout data that determines the sizes of images, their positional relationship, their overlapping, etc.

The display system according to a preferred embodiment of the present invention further includes an input device arranged to perform at least one of: adding an importance level to the importance level rank storage device; changing the importance level stored in the importance level rank storage device; and deleting the importance level stored in the importance level rank storage device. Thus, the driver can customize the importance level rank in the importance level rank storage device where information required for driving is stored.

The display system according to a preferred embodiment of the present invention further includes an input device arranged to perform at least one of: adding information on a smallest visible image size to the first table; changing the information on a smallest visible image size stored in the first table; and deleting the information on a smallest visible image size stored in the first table. Thus, the driver can customize the information on a smallest visible image size for displaying, in a visible manner, information required for maneuvering the vehicle.

The display system according to a preferred embodiment of the present invention further includes an input device arranged to perform at least one of: adding vertical and horizontal deformation ratios to the second table; changing the vertical and horizontal deformation ratios stored in the second table; and deleting the vertical and horizontal deformation ratios stored in the second table. Thus, the driver can customize the vertical and horizontal deformation ratios for displaying, in a visible manner, information required for maneuvering the vehicle.

Preferred embodiments of the present invention are applicable not only to display systems, but also to computer-readable storage mediums storing a display program, a display method, and a program used for these systems.

With the configuration described above, even when a fault in a display loaded in a vehicle is detected, an image in a display fault area can be displayed in a normal display area in the display and thus can be displayed in the same display.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIG. 1 is a block diagram showing the configuration of an image output control section.

FIG. 2 is a block diagram showing a vehicle instrumental panel display system.

FIG. 3-1 is a flow diagram of display data display.

FIG. 3-2 is a flow diagram of display data processing.

FIG. 7 is a flow diagram showing processing performed to customize a screen layout table.

DETAILED DESCRIPTION OF THE PREFERRED EMBODIMENTS

Figure 4A:
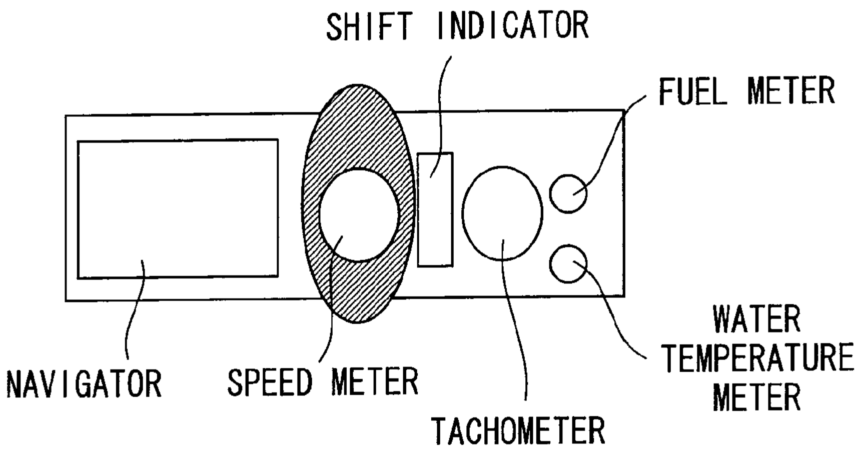
FIGS. 4A-4C illustrate examples of display.

A display system according to a preferred embodiment of the present invention will be described below, referring to FIGS. 1 to 4C. FIG. 2 is a block diagram showing a vehicle instrument panel display system loaded with the display system. As shown in this figure, the instrument panel display system preferably includes: an instrument panel display system 1 according to a preferred embodiment of the present invention; an input and output system (vehicle system 3) for vehicle data; an input and output system (amenity system 4) for an amenity system including a DVD, TV, GPS, Audio, etc.; an input and output system (safety system 5) for a safety system including various CCDs, sensors, etc.; and an in-vehicle LAN 21 for vehicle data transmission. The in-vehicle LAN 21 for vehicle data includes a power train system in-vehicle LAN 21*x* and a body system in-vehicle LAN 21*y*. The power train system in-vehicle LAN 21*x* is connected with an electric control unit (ECU) 28*a* arranged to control an engine system, an electric control unit (ECU) 28*b* arranged to control a gear system, and so on. The body system in-vehicle LAN 21*y* is connected with an electric control unit (ECU) 29*a* arranged to control a door system, an electric control unit (ECU) 29*b* arranged to control a light system; an electric control unit (ECU) 29*c* arranged to control an air conditioning system, and so on.

The instrument panel display system (display system) 1 includes a display platform section 6 (display controller) and a liquid crystal panel 7 (display device). This display platform section 6 includes a display platform microcomputer 9 (hereinafter, referred to as DPF microcomputer 9), a liquid crystal controller 11, a display data memory 15, a power supply circuit 18, a timing generator 12, and a backlight control circuit 13. Further, the liquid crystal controller 11 includes a liquid crystal image quality improving circuit 14 and a multi-display real-time processing circuit 8. Furthermore, this multi-display real-time processing circuit 8 includes an image output control section 16, an image input control section 17, and a standard image interface 19.

The vehicle system 3 includes a vehicle system graphic display controller 34 (hereinafter referred to as vehicle system GDC 34), a vehicle system processor (CPU, processor) 35, and a vehicle system microcomputer 36 compatible with the in-vehicle LAN. The amenity system 4 includes an amenity system graphic display controller 37 (hereinafter referred to as amenity system GDC 37), an amenity system processor (CPU, processor) 38, and an amenity system microcomputer 39 compatible with the in-vehicle LAN. Further, the safety system 5 includes a safety system graphic display controller 40 (hereinafter referred to as safety system GDC 40), a safety system processor (CPU, processor) 41, and a safety system microcomputer 42 compatible with the in-vehicle LAN.

Here, the vehicle system microcomputer 36 is connected to the in-vehicle LAN 21 for vehicle data transmission (the power train system in-vehicle LAN 21*x* and the body system in-vehicle LAN 21*y*). Moreover, the DPF microcomputer 9 of the display platform section 6, the vehicle system microcomputer 36 of the vehicle system 3, the amenity system microcomputer 39 of the amenity system 4, and the safety system microcomputer 42 of the safety system 5 are connected to an in-vehicle LAN 32 for display control data transmission. This in-vehicle LAN 32 preferably is an in-vehicle LAN such as CAN or LIN, and includes a transmission path for, in accordance with the specified format, transmitting and receiving image output control data (to be described later) and screen layout data (to be described later) for screen display control.

Moreover, the vehicle system GDC 34, the amenity system GDC 37, the safety system GDC 40, and the standard image interface 19 of the display platform section 6 are connected to an in-vehicle LAN 31 for image data transmission. This in-vehicle LAN 31 is a high-speed LAN (for example, CAN, MOST, IDB1394), and a transmission path connecting together the display platform section 6 and the GDCs (34, 37, and 40) of the respective systems via a connector. Note that the in-vehicle LAN 31 can be formed with one-to-one exclusive lines.

Hereinafter, functions of the in-vehicle LAN 21 for vehicle data transmission, the vehicle system 3, the amenity system 4, the safety system 5, and the instrument panel section 2 will be described.

To the power train system in-vehicle LAN 21*x* of the in-vehicle LAN 21, the engine system ECU 28*a*, the gear system ECU 28*b*, etc., are connected. The engine system ECU 28*a* performs: transmission of numerical data related to engine control and the engine; reception of control data from the other ECUs; and so on. The gear system ECU 28*b* performs: transmission of numerical data related to gear control and the gear; reception of control data from the other ECUs; and so on. Then, from this power train system in-vehicle LAN 21*x*, data related to alarm information, blinker speed, and rotation speed (real-time data required to be transmitted in real-time with high reliability) is transmitted as vehicle data to the vehicle system microcomputer 36 of the vehicle system 3.

To the body system in-vehicle LAN 21*y* of the in-vehicle LAN 21, the door system ECU 29*a*, the light system ECU 29*b*, the air conditioning system ECU 29*c*, etc. are connected. The door system ECU 29*a* performs: transmission of a door open/close signal; reception of control data from the other ECUs; and so on. The light system ECU 29*b* performs: transmission of a light ON/OFF signal; reception of control data from the other ECUs; and so on. The air conditioning system ECU 29*c* performs: transmission of data related to air conditioning control and the air conditioner; reception of control data from the other ECUs; and so on. Then, from this body system in-vehicle LAN 21*y*, data related to door opening/closing, light, air conditioning control, etc. (data facing no problem even at low speed) is transmitted as vehicle data to the vehicle system microcomputer 36 of the vehicle system 3.

The vehicle system microcomputer 36 of the vehicle system 3 preferably is a microcontroller having an interface of a LAN (local area network), such as CAN, LIN, FlexRay, or the like, specific to automobiles.

This vehicle system microcomputer 36 receives the various vehicle data (vehicle data for the power train system and the body system) from the in-vehicle LAN 21 for vehicle data transmission and transmits them to the vehicle system processor 35.

Moreover, the vehicle system microcomputer 36 transmits the various vehicle data (data related to forward movement, stopping, right turn, left turn, backward movement, travel speed, etc.) received from the in-vehicle LAN 21 to the amenity system microcomputer 39, the safety system microcomputer 42, and the DPF microcomputer 9 of the display platform section 6 via the in-vehicle LAN 32 for display control data transmission.

Further, the vehicle system microcomputer 36 delivers screen layout data (to be described later) and image output control data (to be described later) generated by the vehicle system processor 35 to the in-vehicle LAN 32 for display control data transmission.

The vehicle system processor 35 of the vehicle system 3 receives the various vehicle data transmitted via the vehicle system microcomputer 36 and controls the vehicle system GDC 34 to generate image data (image data corresponding to images of a speedometer, a tachometer, shift lever position, etc.). Further, the vehicle system processor 35 generates the screen layout data for determining sizes of the images, their positional relationship, their overlapping, etc. and the image output control data controlling switching of the images and their layouts.

The vehicle system GDC 34 performs two-dimensional or three-dimensional graphic drawing in response to a command from the vehicle system processor 35, and delivers generated image data to the in-vehicle LAN 31 for image data transmission.

The amenity system microcomputer 39 of the amenity system 4 preferably includes a microcomputer having an interface of a LAN, such as CAN, LIN, FlexRay, or the like, specific to automobiles. The amenity system microcomputer 39 receives the vehicle data transmitted from the vehicle system microcomputer 36 via the in-vehicle LAN 32 and transmits it to the amenity system processor 38.

Further, the amenity system microcomputer 39 delivers screen layout data (to be described later) and image output control data (to be described later) generated by the amenity system processor 38 to the in-vehicle LAN 32 for display control data transmission.

The amenity system processor 38 of the amenity system 4 receives data transmitted from the DVD or TV via an interface 46 or data transmitted from the GPS or Audio via an SCI 47, and the vehicle data transmitted via the amenity system microcomputer 39 and controls the amenity system GDC 37 to generate image data (image data corresponding to a navigation image, a TV image, a DVD image, etc.). The image data corresponding to a navigation image is generated by the amenity system processor 38 through combination of map data from the DVD and vehicle position information from the GPS.

Further, the amenity system processor 38 generates the screen layout data for determining sizes of the images, their positional relationship, etc., and the image output control data controlling switching of the images and their layouts The amenity system GDC 37 performs two-dimensional or three-dimensional graphic drawing in response to a command from the amenity system processor 38, and delivers generated image data to the in-vehicle LAN 31 for image data transmission.

The safety system microcomputer 42 of the safety system 5 preferably is a microcontroller having an interface of a LAN, such as CAN, LIN, FlexRay, or the like, specific to automobiles. The safety system microcomputer 42 receives the vehicle data transmitted from the vehicle system microcomputer 36 via the in-vehicle LAN 32 and transmits it to the safety system processor 41.

Further, the safety system microcomputer 42 delivers screen layout data (to be described later) and image output control data (to be described later) generated by the safety system processor 41 to the in-vehicle LAN 32 for display control data transmission.

The safety system processor 41 of the safety system 5 receives data transmitted from the front CCD, the rear CCD, and the various sensors via an interface 48 and the vehicle data transmitted via the safety system microcomputer 42 and controls the safety system GDC 40 to generate image data (image data corresponding to various CCD images, etc.). More specifically, the safety system processor 41, by using the input images from the various CCDs, performs safety detection processing such as obstacle detection and white line detection to generate alarm image data of the obstacle, and so on. Further, the safety system processor 41 generates the screen layout data for determining sizes of the images, their positional relationship, etc., and the image output control data controlling switching of the images and their layouts. Here, it is also possible to provide a layout such that a display is achieved with the CCD image superimposed on the alarm image.

The safety system GDC 40 performs two-dimensional or three-dimensional graphic drawing in response to a command from the safety system processor 41, and delivers generated image data to the in-vehicle LAN 31 for image data transmission.

The DPF microcomputer 9 of the instrument panel display system 1 preferably is a microcontroller having an interface of a LAN, such as CAN, LIN, FlexRay, or the like, specific to automobiles. The DPF microcomputer 9 receives the various screen layout data and image output control data delivered from the vehicle system microcomputer 36, the amenity system microcomputer 39 and the safety system microcomputer 42 to the in-vehicle LAN 32 and inputs them into the multi-display real-time processing circuit 8. Moreover, the DPF microcomputer 9 receives the vehicle data delivered from the vehicle system microcomputer 36 to the in-vehicle LAN 32 and inputs it into the multi-display real-time processing circuit 8.

The liquid crystal panel 7 of the instrument panel display system 1 preferably is a liquid crystal panel module including a driver IC, a backlight, etc. The timing generator 12 generates signals specific to a liquid crystal panel. The backlight control circuit 13 controls the backlight of the liquid crystal panel 7. The power supply circuit 18 provides a supply voltage to the liquid crystal panel 7. The display data memory 15 temporarily stores and accumulates image data. Moreover, the display data memory 15 is used for operation in executing image processing, etc.

The liquid crystal controller 11 of the instrument panel display system 1 outputs display data to the liquid crystal panel 7. More specifically, in the multi-display real-time processing circuit 8, the liquid crystal controller 11 generates the display data based on the various image data and screen layout data generated in the systems (vehicle system 3, amenity system 4, and safety system 5) and preset screen layout information. Further, in the liquid crystal image quality improving circuit (high-grade display circuit) 14, the liquid crystal controller 11 optimizes (improves the image quality of) this display data in accordance with properties of the liquid crystal panel 7 and outputs it to the liquid crystal panel 7.

The various sections of the multi-display real-time processing circuit 8 will be further described below.

The standard image interface 19 receives image data inputted through an image data LAN such as MOST or IDB1394 or through an exclusive line such as LVDS, DVI, or HDMI. Moreover, the image input control section 17 writes the various data inputted via the standard image interface 19 into a predetermined area of the display data memory 15 based on the screen layout data inputted from the DPF microcomputer 9.

The image output control section 16 reads image data from the display data memory 15, and based on the screen layout data inputted form the DPF microcomputer 9, generates display data for displaying a list of images on the liquid crystal panel 7. This display data is outputted to the liquid crystal panel 7 via the liquid crystal image quality improving circuit 14. As a result, in accordance with the vehicle traveling state, the images respectively generated in the systems (vehicle system 3, amenity system 4, and safety system 5) are displayed at predetermined positions of the liquid crystal panel 7 in the layouts respectively generated by the systems.

The display data of the liquid crystal panel 7 preferably is generated in the following manner. First, vehicle data is transmitted from the engine system ECU 28*a* and the gear system ECU 28*b* to the vehicle system microcomputer 36, and further transmitted from the vehicle system microcomputer 36 to the amenity system microcomputer 39 and the safety system microcomputer 42 via the in-vehicle LAN 32. The vehicle data described above is also transmitted from the vehicle system microcomputer 36 to the DPF microcomputer 9 of the display platform section 6.

Next, screen display provided during traveling will be described. Arranged during traveling preferably are: a car navigation screen on a left area as viewed from the operator (driver), a speedometer screen in an area on the right thereof, a shift indicator screen in an area on the right thereof, a tachometer screen in an area on the right thereof, and a fuel system/water temperature meter screen in an area on the right thereof. Display data for displaying such screens are generated in the following manner.

First, vehicle data is transmitted from the engine system ECU 28*a* and the gear system ECU 28*b* to the vehicle system microcomputer 36, and further transmitted from the vehicle system microcomputer 36 to the amenity system microcomputer 39 and the safety system microcomputer 42 via the in-vehicle LAN 32. The vehicle data described above is also transmitted from the vehicle system microcomputer 36 to the DPF microcomputer 9 of the display platform section 6.

Here, the vehicle system microcomputer 36 transmits the received vehicle data (data on the speed and gear position) to the vehicle system processor 35. Here, the vehicle system processor 35, based on the vehicle data transmitted, recognizes that the vehicle is making forward movement, generates image data corresponding to images of the speedometer/tachometer screens and images of the fuel meter/seat belt/door opening and closing/blinker screens by using the vehicle system GDC 34, and delivers them to the in-vehicle LAN 31. Further, the vehicle system processor 35 generates screen layout data related to layouts of the images (their sizes, positional relationship, overlapping, etc.) and image output control data controlling switching of the images and their layouts, and delivers them to the in-vehicle LAN 32.

The amenity system microcomputer 39 transmits the received vehicle data (data on the speed and gear position) to the amenity system processor 38. Here, the amenity system processor 38, based on the vehicle data transmitted, recognizes that the vehicle is making forward movement, receives the DVD data (map data) inputted from the interface 46, the GPS information inputted from the SCI 47 and the aforementioned vehicle data and controls the amenity system GDC 37 to generate image data corresponding to a navigation image. This image data is delivered to the in-vehicle LAN 31 by the amenity system GDC 37. Further, the amenity system processor 38 generates the screen layout data related to layouts of the aforementioned images (their sizes, positional relationship, overlapping, etc.) and the image output control data controlling the switching of the images and their layouts. These data are delivered to the in-vehicle LAN 32 via the amenity system microcomputer 39.

The image data respectively delivered from the systems (vehicle system 3 and amenity system 4) to the in-vehicle LAN 31 are inputted into the image input control section 17 via the standard image interface 19. On the other hand, the screen layout data and image output control data respectively delivered from the systems to the in-vehicle LAN 32 are inputted into the multi-display real-time processing circuit 8 (image output control section 16 and image input control section 17) via the DPF microcomputer 9.

The various image data inputted into the image input control section 17 are written into a predetermined area of the display data memory 15 based on the screen layout data inputted from the DPF microcomputer 9.

The image output control section 16, based on the screen layout data and image output control data inputted from the DPF microcomputer 9, reads image data from the display data memory 15, and generates display data for displaying a list of the images on the liquid crystal panel 7.

The display data generated by the image output control section 16 is outputted via the liquid crystal image quality improving circuit 14 to the liquid crystal panel 7 to be displayed thereon.

In Event of a Display Fault

Hereinafter, referring to FIGS. 1, 2, 3-1, 3-2, and 4A-4C, a description will be given, concerning an example where, when a display fault area having difficulties in displaying display data emerges in the liquid crystal panel 7, the display data is displayed in a displayable normal display area.

To the instrument panel display system 1 shown in FIG. 2, an input device 53 and an information storage medium 54 are connected. This instrument panel display system 1 includes the display platform section 6 and the liquid crystal panel 7. The display platform section 6 includes the DPF microcomputer 9, the liquid crystal controller 11, the display data memory 15, the power supply circuit 18, the timing generator 12, and the backlight control circuit 13. Further, the liquid crystal controller 11 includes the liquid crystal image quality improving circuit 14 and the multi-display real-time processing circuit 8. Further, the multi-display real-time processing circuit 8 includes the image output control section 16, the image input control section 17, and the standard image interface 19. The image output control section 16 included in the multi-display real-time processing circuit 8 includes a display data generation section 50, a display area change section 51, and a screen layout table 52. To this image output control section 16, the input device 53 is connected. Further, the computer-readable information storage medium 54 storing display programs of the display system is connected to the display platform section 6 included in the instrument panel display system 1. Use of the information storage medium 54 as an area storing the display programs of the display system is shown as an example; however, note that the display programs can also be stored in the display data memory 15.

The input device 53 preferably is an interface including at least one of a joystick, a trackball, a touch panel, an operation key, and sound. The input device 53 shown in FIG. 1 is used for selecting, from among a plurality of display data generated by the display data generation section 50, the one to be displayed on the liquid crystal panel 7, or used for performing various operations such as adding, changing, and deleting the screen layout data or information on screen layout data generation information stored in the screen layout table 52.

The input device 53 can also be used upon the emergence of a display fault area in the liquid crystal panel 7. Upon the emergence of a display fault area, this area is specified by using the input device 53. The input device 53 outputs a display fault area emergence specification signal to the display data generation section 50. The display data generation section 50, based on the inputted display fault area emergence specification signal, controls the display area change section 51 to stop inputting of the image layout data from the image input control section 17.

It has been described above that the display fault area is specified by using the input device 53 and the display fault area emergence specification signal is outputted to the display data generation section 50. Alternatively, however, the display fault area may be detected by a sensor or a detection circuit and the display fault area emergence specification signal may be outputted by either of these sensor and detection circuit to the display data generation section 50.

The display data generation section 50 reads via the display area change section 51 the screen layout data stored in the image layout table 52 and the image data stored in the display data memory 15 and delivered by the systems (vehicle system 3, amenity system 4, and safety system 5). Further, the display data generation section 50 generates, from the screen layout data of the image layout table 52 and the image data of the display data memory 15, display data for list display on the liquid crystal panel 7.

This display data is outputted to the liquid crystal panel 7 via the liquid crystal image quality improving circuit 14. As a result, in accordance with the vehicle traveling state and the display state of the liquid crystal panel 7, the images respectively generated in the systems (vehicle system 3, amenity system 4, and safety system 5) are displayed at predetermined position of the liquid crystal panel 7 (position in accordance with the screen layout information).

The screen layout table 52 includes: a pattern storage device arranged to store a plurality of patterns of screen layout data including a display fault area and a normal display area; an importance level rank storage device arranged to store importance level ranks of image data to be preferentially displayed as display data on the liquid crystal panel 7; a first table storing smallest visible sizes of the respective image data described above; and a second table storing visible vertical and horizontal deformation ratios of the respective image data described above.

Next, a description will be given concerning operation performed by the display system displaying display data in a displayable normal display area when a display fault area having difficulties in displaying the display data emerges in the liquid crystal panel 7.

When a display fault area having difficulties in displaying display data emerges on the liquid crystal panel 7, a plurality of pieces of screen layout data stored in the pattern storage device of the screen layout table 52 are read. The pattern storage device stores the screen layout data that assumes the emergence of a display fault area: for example, screen layout data for displaying image data in four of five columns, excluding the leftmost column, into which the liquid crystal panel 7 is divided; screen layout data for displaying image data in the four columns excluding the central column; and so on. The pattern storage device stores a plurality of patterns, such as combination patterns of not only columns but also rows, a pattern for a case where a plurality of display fault areas emerge, etc.

The patterns of the screen layout data read from the pattern storage device are displayed on the liquid crystal panel 7 one by one or all at once. From among the displayed screen layout data, the driver selects the optimum screen layout by using the input device 53. Alternatively, based on the display fault area emergence specification signal outputted by the input device 53, the display data generation section 50 selects, from among the screen layout data read from the pattern storage device, the pattern corresponding to the shape of the current normal display area in the liquid crystal panel 7 (S1 in FIG. 3-1).

Based on the selected screen layout data, display data for list display on the liquid crystal panel 7 is generated from each image data in the display data generation section 50. The display data generated is displayed on the liquid crystal panel 7. However, when a total display fault area occupies a large portion of the liquid crystal panel 7, in the generation of the display data based on the screen layout data read from the pattern storage device, the image data such as the speedometer, tachometer, fuel meter, navigator, CCD image, etc., may not all fit within the normal display area. The display data generation section 50, based on the selected screen layout data and the image data, judges whether or not the display data can be generated. If all the image data fit in, they are displayed on the liquid crystal panel 7. If not all the image data fit in, the processing proceeds to S3 where image data processing and selection is performed (S2 in FIG. 3-1).

In S3 where the display data processing is performed, a display data processing method is first selected (S3-1 of FIG. 3-1). Next, image processing is performed in the selected processing method (S3-2 of FIG. 3-1). The display data processing methods prepared include three kinds of processing methods: image data selection based on an importance level rank, image data processing based on image data reduction, and reduction of image data selected based on an importance level rank, and selection can be made from among these methods (S3-1). In S3 where the display data processing is performed, processing method information is added, so that the image data is processed with reference to this processing method information (S3-2). This processing method information includes: selected processing method information indicating which processing method has been selected; and importance level rank selection information and reduction ratio selection information as processing condition.

Image Data Selection Based on an Importance Level Rank

FIG. 3-2 shows a flow of display data processing performed in S3-1 and S3-2. If the image data selection based on an importance level rank is selected in the display data processing method selection (S3-1), it is stored into the selected processing method information of the processing method information that the image data selection based on an importance level rank has been selected, the highest importance level rank is stored into the importance level rank selection information, and further the largest reduction ratio is stored into the reduction ratio selection information. Based on this selected processing method information, a step of proceeding from the display data processing method selection (S3-1) to A is selected, so that the processing goes into a step of display image selection based on an importance level. The importance level rank of each image data is stored in the importance level rank storage device of the screen layout table 52. This importance level rank is determined by the importance level of information, of those provided by the vehicle, which is required for the driver to maneuver the vehicle. For example, pieces of information on an alarm about a fault occurring in the vehicle, the speed and fuel consumption condition, etc., which are highly likely to have an influence on the vehicle safety when not provided are given high ranks, while pieces of information relating to the navigator, tachometer, TV, movies, etc., which are less likely to have a large influence on the vehicle safety even when not provided are given low ranks. Moreover, for pieces of information placed at the same rank, priority levels are set. When the navigator, tachometer, TV, movies, etc. are at the same rank, the pieces of information regarding the navigator and tachometer are provided with high priority levels, while the pieces of information regarding the TV and movies are provided with low priority levels.

Next, in the step of display image selection based on an importance level, all the image data excluding the importance level rank stored in the importance level rank selection information are set as being non-selected. Here, since the highest importance level rank is stored in the importance level rank selection information, by referring to the importance level ranks of the respective image data stored in the importance level rank storage device, any image data corresponding to the highest importance rank is set as being selected, while any image data not corresponding to the highest importance level rank is set as being non-selected.

Next, in the step of judging whether or not the processed data can be displayed, it is evaluated whether or not the display data generated from the selected image data can be displayed on the liquid crystal panel 7, and until the evaluation confirms either that the data can be displayed on the liquid crystal panel 7 or that the data cannot be displayed on the liquid crystal panel 7, the processing is returned by a Loop of FIG. 3-2 to the step of continuing the image data processing. Judging whether or not the data can be displayed is achieved by evaluating the following three items based on image information (size, width, height, and importance level rank). At the first item, for each normal display area, evaluation is performed by using image information (size, width, and height) on the display data generated by using the image data selected in correspondence with the normal display area and information (size, width, and height) on the normal display area. At the second item, it is evaluated whether or not the importance level stored in the importance level rank selection information is highest. At the third item, it is evaluated whether or not the image data is in a smallest visible image size. If it is evaluated that the image data is not in the smallest visible image size, it is evaluated whether or not the reduction ratio stored in the reduction ratio selection information is smallest. Evaluation patterns provided by the step of judging whether or not the processed data can be displayed are classified into the following four types.

In the step of judging whether or not the processed data can be displayed, the evaluation by the first item is first executed. There are four evaluation patterns as follows. First, in the case of NG at the first item evaluation, the evaluations by the second and third items are executed. In the case of OK at the first item evaluation where it is evaluated that the image information on the display data is smaller than the information on the normal display area, the processing goes into display data selection (S6 in FIG. 3-1) without executing the evaluations by the second and third items (Evaluation pattern 1).

In the case of NG where it is evaluated that the information on the display data is larger than the information on the normal display area, the evaluations by the second and third items are made. Based on results of the evaluations by the second and third items, it is determined whether to proceed to the step of continuing the image data processing by a Loop of FIG. 3-2 or to proceed to display image digitalization based on an importance level (S4 in FIG. 3-1). As a result of the evaluations by the second and third items, if it is evaluated at the second item evaluation that all the selected image data are placed at the highest importance level rank only and also if it is evaluated at the third item evaluation that they are in the smallest visible image size or they are in the smallest visible image size although they are not actually in the smallest visible size, the processing proceeds to the display image digitalization based on an importance level (S4 in FIG. 3-2) (Evaluation pattern 2).

Moreover, as a result of the evaluations by the second and third items, if it is evaluated at the second item evaluation that the selected image data includes an image at the importance level rank other than the highest one, the evaluation by the third item is performed. At the third item evaluation, if it is evaluated that the selected image data is in an image size equal to or larger than the smallest visible image size or if it is evaluated that the reduction ratio stored in the reduction ratio selection information is not smallest, the importance level rank in the importance level rank selection information is updated to a one-rank higher importance level rank, and the reduction ratio stored in the reduction ratio selection information is updated to a one-rank lower reduction ratio. Further, the processing proceeds by a Loop to the step of continuing the image data processing (Evaluation pattern 3). If the image data selection based on an importance level is selected, since only the highest-rank image data is selected, this evaluation pattern 3 applies, and thus it is evaluated whether or not the next evaluation pattern 4 applies.

As a result of the evaluations by the second and third items, in the case of NG at the first item evaluation in the step of judging whether or not the processed data can be displayed, if it is judged at the second item evaluation that all the selected image data are placed at the highest importance level rank only, and also it is evaluated at the third item evaluation that they are in a size equal to or larger than the smallest visible image size, and if it is further evaluated that the reduction ratio stored in the reduction ratio selection information is not smallest, the processing proceeds by a Loop to the step of continuing the image data processing (Evaluation pattern 4).

If the evaluation result applies to Evaluation pattern 1, in the display data selection (S6), display data generation based on the selected image data is performed. With Evaluation pattern 1, only one display data is generated, and thus it is automatically confirmed as display data for display on the liquid crystal panel 7 and this confirmed display data is outputted by the display data generation section 50 and displayed on the liquid crystal panel 7.

If the evaluation result applies to Evaluation pattern 2, in the display image digitalization based on an importance level (S4), the importance level rank and priority level of the image data selected as the display data are evaluated. If it is evaluated that the image data selected as the display data include the image data at a lower importance-level rank, the image data at the lowest importance level rank is switched to display data composed of at least either of numbers and characters. If it is evaluated that all the image data selected as the display data are placed at the highest importance level rank only, priority level evaluation is performed and the image data with the lowest priority level is switched to display data composed of at least either of numbers and characters. If the image data selection based on an importance level rank is selected as a processing method in (S301), all the image data are placed at the highest importance-level rank only, and thus the results are consequently influenced by the priority level evaluation and the image data with the lowest priority level is switched to display data of numbers or characters.

It is evaluated, in judgment as to whether or not the digitalized data can be displayed (S5), whether or not the display composed of at least either of numbers and characters generated by the display image digitalization based on an importance level (S4) and the display data composed of image data can be displayed on the liquid crystal panel 7. If it is judged that they can be displayed, the processing proceeds to the display data selection (S6). In the display data selection (S6), if a plurality of pieces of display data have been generated, it is determined which of them is to be selected and displayed on the liquid crystal panel 7. However, if the image data selection based on an importance level is selected as a processing method, only one piece of display data is generated, and thus display data automatically created is selected and, by using the generated display data, display data for display on the liquid crystal panel 7 is generated by the display data generation section 50.

Contrarily, if it is judged, in the judgment on whether or not the digitalized data can be displayed (S5), that the aforementioned data cannot be displayed, the processing returns to the display image digitalization based on an importance level (S4), and evaluation of the importance level rank and priority level of the image data selected as the display data and switching to display data composed of at least either of numbers and characters based on the evaluation result are performed again. As a result of executing such a routine, the display data digitalization based on an importance level (S4) is executed until display data displayable on the liquid crystal panel 7 is generated.

If the evaluation result applies to Evaluation pattern 4, processing performed in a case where the image data processing based on image data reduction is selected in the display data processing method selection (S31) is performed. The processing performed on the image data will be described below (in the image data processing based on image data reduction).

Image Data Processing Based on Image Data Reduction

If the image data processing based on image data reduction is selected in the display data processing method selection (S3-1), it is stored into the selected processing method information of the processing method information that the image data processing based on image data reduction has been selected, it is stored into the importance level rank selection information that all the importance level ranks are to be selected, and further the smallest reduction ratio is stored into the reduction ratio selection information. Based on this selected processing method information, a step of proceeding from the display data processing method selection to B (S3-1) is selected, and the processing goes into a step of display image reduction. Also, if the image data selection based on an importance level rank is selected in the display data processing method selection (S3-1) and further it is evaluated, in the step of judging whether or not the processed data can be displayed, that the results apply to Evaluation pattern 4, the following processing is performed.

In the step of display image reduction, information for the image data reduction is stored in the first and second tables in the screen layout table 52 of FIG. 1. The first table stores the information on smallest visible image sizes of image data. The second table stores, as vertical and horizontal deformation ratios of images, at least three types of deformations: deformation with vertical and horizontal deformation ratios of the same value; deformation with vertical and horizontal deformation ratios of different values; and deformation with either of vertical and horizontal deformation ratios fixed and the other thereof varied. Moreover, the second table stores at least one rank for each of the different types.

In the step of display data reduction, for each image data, first deformation based on the smallest visible image size stored in the first table and image data reduction (hereinafter referred to as the second deformation) based on the vertical and horizontal deformation ratios stored in the second table are performed. First, in the step of display image reduction, the first deformation is preferentially performed. In the step of judging whether or not the evaluation is possible, if the evaluation of the image data subjected to the first deformation confirms either that it can be displayed on the liquid crystal panel 7 or that it cannot be displayed on the liquid crystal panel 7, the step of display image reduction performs processing by the second deformation. In the second deformation, the three types of deformations are performed sequentially in the following order: deformation with vertical and horizontal deformation ratios of the same value; deformation with vertical and horizontal deformation ratios of different values; and deformation with either of vertical and horizontal deformation ratios fixed and the other thereof varied. Until evaluation in the next step of judging whether or not the processed data can be evaluated confirms either that it can be displayed or that it cannot be displayed, the same type of deformation in the second deformation is continuously performed in the step of display image reduction.

Next, in the step of judging whether or not the processed data can be displayed, it is evaluated whether or not the image data subjected to the first deformation and the image data subjected to the second deformation can be displayed on the liquid crystal panel 7. Until the evaluation confirms either that the data can be displayed on the liquid crystal panel 7 or that the data cannot be displayed on the liquid crystal panel 7, the processing is returned by a Loop of FIG. 3-2 to the step of continuing the image data processing. Concerning whether or not the data can be displayed, the following two items are evaluated based on the image information (size, width, and height) and the reduction ratio selection information. At the first item, by using the image information (size, width, and height) on the display data and the information (size, width, and height) on the normal display area, it is evaluated whether or not the data can be displayed in the normal display area. At the second item and at the third item, it is evaluated whether or not the image data is in the smallest visible image size. If it is evaluated that the image data is not in the smallest visible image size, it is evaluated whether or not the reduction ratio stored in the reduction ratio selection information is smallest. Evaluation patterns provided by the step of judging whether or not the processed data can be displayed are classified into the following five types.

At the evaluation in the step of judging whether or not the processed data can be displayed, until the evaluation of the image data subjected to the first deformation and evaluation of the image data subjected to the second deformation confirm either that the data can be displayed on the liquid crystal panel 7 or that the data cannot be displayed on the liquid crystal panel 7, the processing returns to the step of display image reduction through the image data processing information step. For the image data resulting in OK at the first item evaluation, the processing proceeds to the display image selection (S6) (Evaluation pattern 5). For the image data resulting in NG at both the first item evaluation and the second item evaluation, the processing proceeds to the display image digitalization based on an importance level (S4) (Evaluation pattern 6).

A description will be given below, concerning a case where the processing is returned to the step of display image reduction through the step of continuing the image data processing if the first item evaluation results in NG at the evaluation in the step of judging whether or not the processed data can be displayed. At the second item, it is first evaluated whether or not the image data to be evaluated is in the smallest visible image size. The image subjected to the first deformation is already in the smallest visible image size, and thus transition to three types of deformations in the second deformation occurs. Thus, the processing is returned to the step of display image reduction through the step of continuing the image data processing. If it is evaluated that the image data subjected to the second deformation is in the smallest visible image size, even when it is not with the smallest deformation ratio, the processing goes into another different type of deformation in the second deformation (Evaluation pattern 7). If it is evaluated that the image data is in the smallest visible image size in all the three types of deformations, or if it is evaluated that it is in the smallest visible image size although it is actually not in the smallest visible image size, the processing proceeds to the display image digitalization based on an importance level (S4) (Evaluation pattern 8). If it is evaluated that the image data subjected to the second deformation is not in the smallest visible image size, evaluations are made sequentially to see whether or not pieces of reduction ratio selection information respectively corresponding to the three types of deformations in the second deformation indicate the smallest deformation ratio. Since the same type of deformation is performed continuously, when the reduction ratio selection information corresponding to the type of deformation being performed continuously in the processing reaches the smallest deformation ratio, the processing goes into the next type of deformation. While the same type of deformation is performed continuously, the deformation ratio stored in the corresponding reduction ratio selection information is changed in decrements of one rank. Based on the reduction ratio selection information, the processing is returned to the step of display image reduction through the step of continuing the image data processing (Evaluation pattern 9).

If the evaluation result applies to Evaluation pattern 5, the same processing as that performed when the evaluation result applies to Evaluation pattern 1 is performed. If the evaluation result applies to Evaluation patterns 6 and 8, the same processing as that performed when the evaluation result applies to Evaluation pattern 2 is performed.

If the evaluation pattern applies to Evaluation patterns 7 and 9, the second deformation based on the reduction ratio selection information is performed in the step of display image reduction. Based on the reduction ratio selection information, a specific type of deformation is performed. Until the evaluation in the next step of judging whether or not the processed data can be evaluated confirms either that the data can be displayed or that the data cannot be displayed, the same type of deformation in the second deformation is continuously performed in the step of display image reduction.

Reduction of Image Data Selected Based on an Importance Level Rank

If the reduction of image data selected based on an importance level rank is selected in the display data processing selection (S3-1), it is stored into the selected processing method information of the processing method information that the reduction of image data selected based on an importance level rank has been selected, the second lowest importance level rank is stored into the importance level rank selection information, and further the largest reduction ratio is stored into the reduction ratio selection information. Based on this selected processing method information, a step of proceeding from the display data processing method selection (S3-1) to A is selected, so that the processing in the step of display image selection based on an importance level is performed and further by C, the processing in the step of display data reduction is performed.

Next, in the step of display image selection based on an importance level, all the image data at importance level ranks other than the one stored in the importance level rank selection information are set as being non-selected. Here, since the second lowest importance level rank is stored in the importance level rank selection information, by referring to the importance level rank of each image data stored in the importance level rank storage device, the image data at the importance level rank corresponding to the second lowest importance level rank is set as being selected and the image data at the lowest importance level rank is set as being non-selected. Next, the processing goes into the step of display image reduction.

Next, in the step of display image reduction, the processing on the selected image data is performed. For each image data, the first deformation based on the smallest visible image size stored in the first table and image data reduction (hereinafter referred to as the second deformation) based on the vertical and horizontal deformation ratios stored in the second table are performed. In the step of display image reduction, the first deformation is preferentially performed. In the step of judging whether or not evaluation can be performed, if the evaluation of the image data subjected to the first deformation confirms either that it can be displayed on the liquid crystal panel 7 or that it cannot be displayed on the liquid crystal panel 7, the step of display image reduction performs processing by the second deformation. In the second deformation, image data deformations, i.e., deformation with vertical and horizontal deformation ratios of the same value; deformation with vertical and horizontal deformation ratios of different values; and deformation with either of vertical and horizontal deformation ratios fixed and the other thereof varied are performed one by one in the order just presented. Until evaluation in the next step of judging whether or not the processed data can be evaluated confirms either that it can be displayed or that it cannot be displayed, the same type of deformation in the second deformation is continuously performed in the step of display image reduction.

Next, in the step of judging whether or not the processed data can be displayed, it is evaluated whether or not the display data generated from the selected image data can be displayed on the liquid crystal panel 7, and until the evaluation confirms either that the data can be displayed on the liquid crystal panel 7 or that the data cannot be displayed on the liquid crystal panel 7, the processing is returned by a Loop of FIG. 3-2 to the step of continuing the image data processing. Judging whether or not the data can be displayed is achieved by evaluating the following three items based on image information (size, width, height, and importance level rank). At the first item, for each normal display area, evaluation is performed by using image information (size, width, and height) concerning the display data generated by using the image data selected in correspondence with the normal display area and information (size, width, and height) on the normal display area. At the second item, it is evaluated whether or not the importance level stored in the importance level rank selection information is highest. At the third item, it is evaluated whether or not the image data is in a smallest visible image size. If it is evaluated that the image data is not in the smallest visible image size, it is evaluated whether or not the reduction ratio stored in the reduction ratio selection information is smallest. Evaluation patterns provided by the step of judging whether or not processed data can be displayed are classified into the following five types.

In the step of judging whether or not the processed data can be displayed, evaluation by the first item is first executed. There are four evaluation patters as follows. First, in the case of NG at the first item evaluation, evaluations by the second and third items are executed. In the case of OK at the first item evaluation where it is evaluated that the image information on the display data is smaller than the information on the normal display area, the processing goes into display data selection (S6 in FIG. 3-1) without executing the evaluations by the second and third items (Evaluation pattern 10). In the case of NG where it is evaluated that the information on the display data is larger than the information on the normal display area, the evaluations by the second and third items are made. Based on results of the evaluations by the second and third items, it is determined whether to proceed to the step of continuing the image data processing by a Loop of FIG. 3-2 or to proceed to display image digitalization based on an importance level (S4 in FIG. 3-1). As a result of the evaluations by the second and third items, if it is judged at the second item evaluation that all the selected image data are placed at the highest importance level rank only and also if it is evaluated at the third item evaluation that they are in the smallest visible image size or they are in the smallest visible image size although they are not actually in the smallest visible size, the processing proceeds to the display image digitalization based on an importance level (S4 in FIG. 3-2) (Evaluation pattern 11).

Moreover, as a result of the evaluations by the second and third items, if it is evaluated at the second item evaluation that the selected image data does not exceed the highest importance level rank, the third item evaluation is performed. At the third item evaluation, the image data subjected to the first deformation in the step of display image reduction is already in the smallest visible image size, and thus the processing goes into the three types of deformations in the second deformation. Evaluations are made sequentially to see whether or not pieces of reduction ratio selection information respectively corresponding to the three types of deformations in the second deformation indicate the smallest deformation ratio. Since the same type of deformation is performed continuously, when the reduction ratio selection information corresponding to the type of deformation being performed continuously in the processing reaches the smallest deformation ratio, the processing goes into the next type of deformation. While the same type of deformation is performed continuously, the deformation ratio stored in the corresponding reduction ratio selection information is changed in decrements of one rank. Based on the reduction ratio selection information, the processing is returned to the step of display image reduction through the step of continuing the image data processing. At the third item, it is first evaluated whether or not the image data targeted for evaluation is in the smallest visible image size. The image data subjected to the first deformation is already in the smallest visible image size, and thus the processing goes into the three types of deformations in the second deformation. Thus, the processing is returned to the step of display image reduction through the step of continuing the image data processing. If it is evaluated that the image data subjected to the second deformation is in the smallest visible image size, even when the deformation ratio is not smallest, the processing goes into a different type of deformation (Evaluation pattern 12). If it is evaluated that the respective pieces of image data from the three types of deformations are in the smallest visible image size, or if it is evaluated that they are in the smallest visible image size although they are actually not in the smallest visible image size, the processing proceeds to the display image digitalization based on an importance level (S4) (Evaluation pattern 13). Evaluations are made sequentially to see whether or not pieces of reduction ratio selection information respectively corresponding to the three types of deformations in the second deformation indicate the smallest deformation ratio. Since the same type of deformation is performed continuously, when the reduction ratio selection information corresponding to the type of deformation being performed continuously in the processing reaches the smallest deformation ratio, the processing goes into the next type of deformation. While the same type of deformation is performed continuously, the deformation ratio stored in the corresponding reduction ratio selection information is changed in decrements of one rank. Based on the reduction ratio selection information, the processing is returned to the step of display image reduction through the step of continuing the image data processing. If the second deformation continues, the importance level rank selection information is not updated, and when the three types of deformations in the second deformation have ended, if the third item evaluation results in NG, the importance level rank stored in the importance level rank selection information is updated to one higher rank. If the importance level rank selection information is updated, the processing is returned to the step of display image selection based on an importance level through the step of continuing the image data processing (Evaluation pattern 14).

If the evaluation result applies to Evaluation pattern 10, the same processing as that performed when the evaluation result applies to Evaluation pattern 1 is performed. If the evaluation result applies to Evaluation patterns 11 and 13, the same processing as that performed when the evaluation result applies to Evaluation pattern 1 is performed.

If the evaluation pattern applies to Evaluation patterns 12, the processing is returned to the step of display image reduction, where the second deformation based on the reduction ratio selection information is performed. Based on the reduction ratio selection information, a specific type of deformation is performed. Until the evaluation in the next step of judging whether or not the processed data can be evaluated confirms either that the data can be displayed or that the data cannot be displayed, the same type of deformation in the second deformation is continuously performed in the step of display image reduction.

If the evaluation result applies to Evaluation pattern 14, the processing returns to the step of display image selection based on an importance level, and based on the updated importance level rank selection information, any image data at the importance level rank lower than the one stored is set as being non-selected. Any image data at the importance level rank equal to or larger than the importance level rank stored in the importance level rank selection information is set as being selected. Next, the processing goes into the step of display image reduction.

Figure 4B:
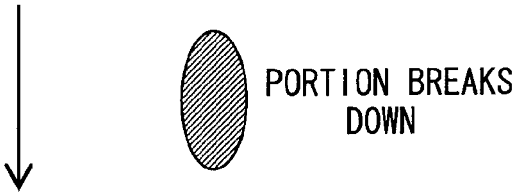
Figure 4C:
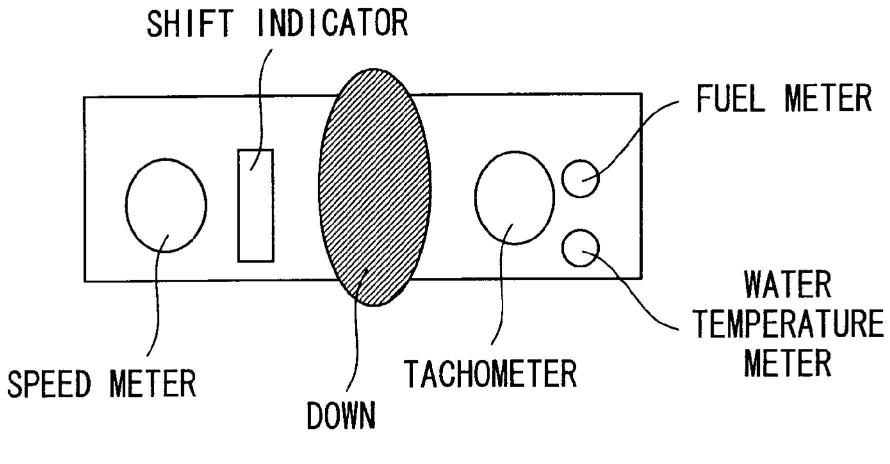
Figure 5:
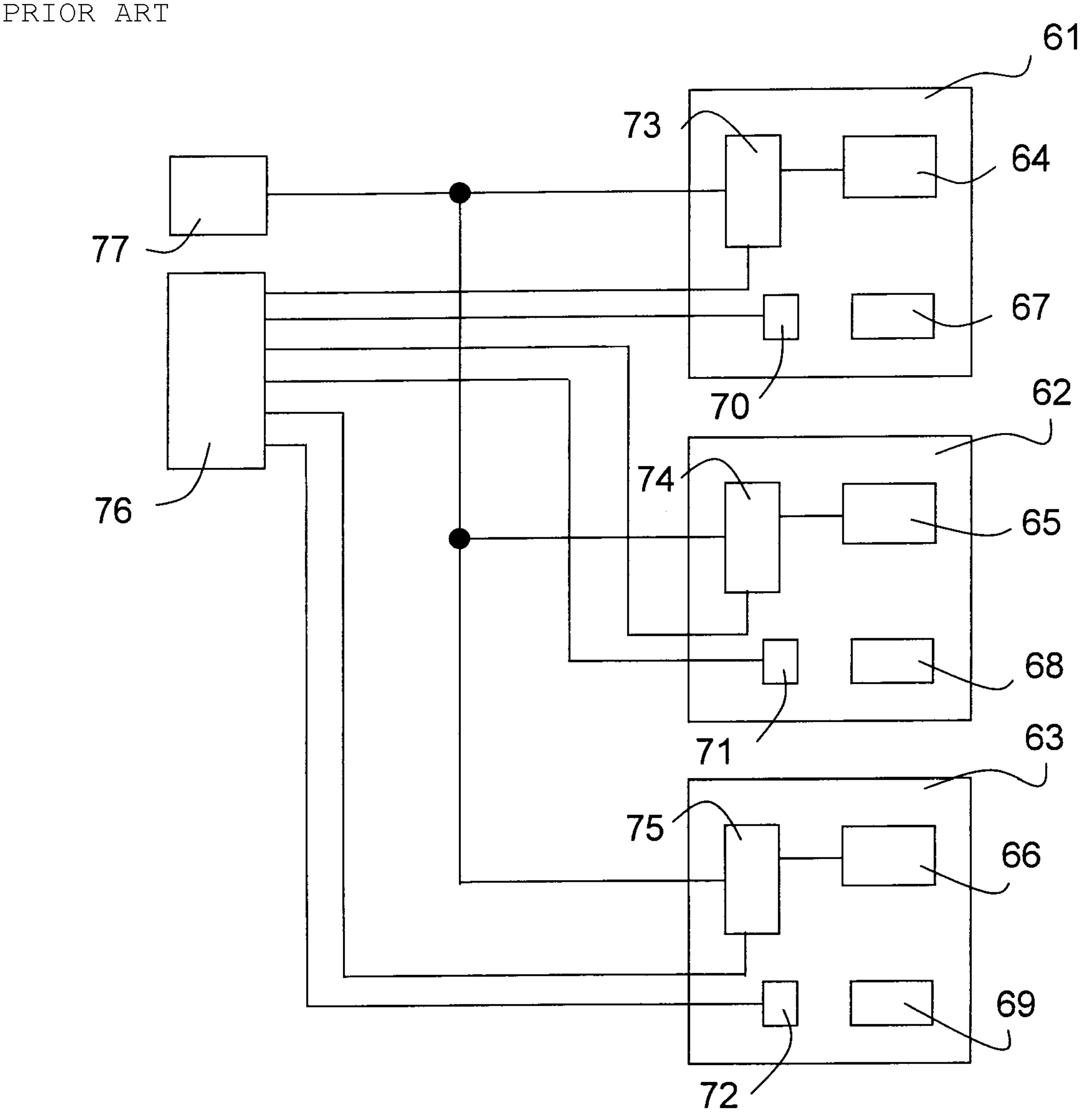
FIG.5 PRIOR ART
FIG. 5 is a block diagram showing a conventional vehicle instrument panel display system.
Figure 6:
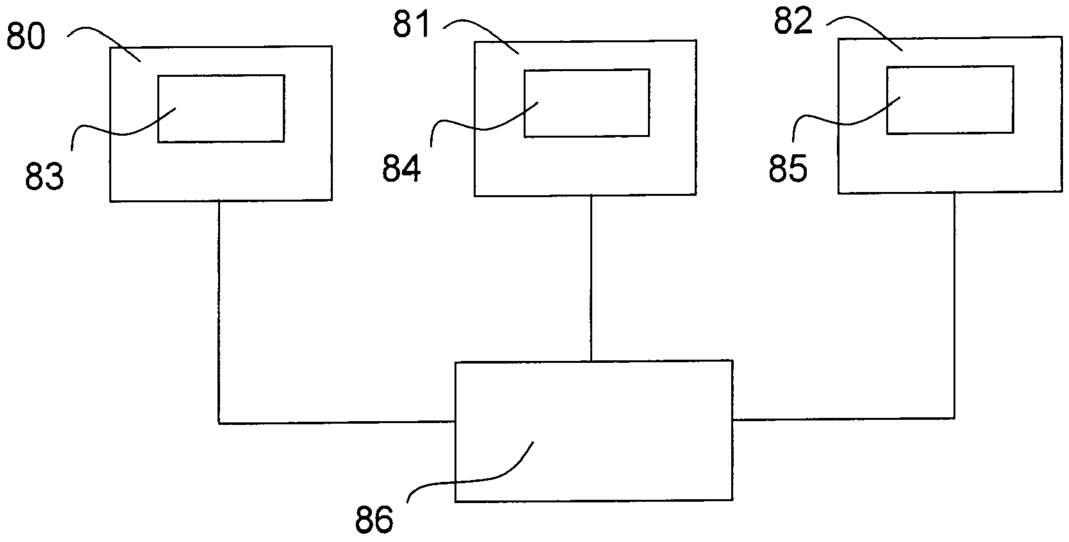
FIG.6 PRIOR ART
FIG. 6 is a block diagram showing a conventional vehicle instrument panel display system.

Based on examples of display shown in FIGS. 4A-4C, a description will be given, referring to an example where display data is displayed in a displayable normal display area when a display fault area emerges in the liquid crystal panel 7.

When a display fault area with difficulties in displaying display data emerges in the liquid crystal panel 7, the driver specifies the display fault area by using the input device 53. Upon the specification of the display fault area, a display fault area emergence specification signal is outputted from the input device 53 and inputted into the display area change section 51. When the display fault area emergence specification signal has been inputted, the display area change section 51 stops inputting of screen layout data into the image output control section 16 via the image input control section 17 and outputs information stored in the screen layout table 52 to the display data generation section 50. In the event of a fault in an area of the liquid crystal panel 7 that has been displaying the speedometer as shown in FIGS. 4A-4C, the specification of the display fault area by using the input device 53 is performed.

When the display fault area emergence specification signal outputted from the input device 53 has been inputted into the display area change section 51, the optimum screen layout data for the current liquid crystal panel 7 can be selected from the pattern data storage device of the screen layout table 52. For the selection of the optimum screen layout data for the current liquid crystal panel 7, a plurality of pieces of screen layout data stored in the pattern storage device are to be displayed on the liquid crystal panel 7 via the display data generation section 50. To select, by using the input device 53, the screen layout data to be read from the pattern storage device, pieces of the layout data are displayed on the liquid crystal panel 7 one or more at a time. When the optimum screen layout data has been selected from among the displayed screen layout data, the input device 53 outputs a selection signal to the display data generation section 50. The display data generation section 50, in response to the selection signal, reads the image data from the display data memory 15 based on the selected screen layout data and generates display data.

However, in the display data generation section 50, if it is judged that it is difficult to display, with the selected layout data, all the information that have been displayed up to this point (S2 of FIG. 3-1), data stored in a database of at least one of the importance level rank storage device, first table, and second table of the screen layout table 52 is read out via the display area change section 51 to the display data generation section 50, and image data processing (S3-1 of FIG. 3) is performed.

Here, if the driver selects the image data selection based on an importance level rank as an image processing method, the display data generation section 50, as image data to be displayed on the liquid crystal panel 7, make a selection from among the speedometer, shift indicator, tachometer, and fuel system/water temperature meter based on the importance level rank.

Next, based on the selected screen layout data, the display data generation section 50 generates display data for arranging the speedometer and the shift indicator in a normal display area on the left of the display fault area and the tachometer and the fuel system/water temperature meter in a display normal area on the right of the display fault area. The generated display data is outputted from the display data generation section 50 and displayed on the liquid crystal panel 7.

Screen Layout Table Customization (Pattern Storage Device)

Information stored in the pattern storage device, the importance level rank storage device, the first table, and the second table included in the screen layout table 52 can be customized by using the input device 53 while being displayed on the liquid crystal panel 7. As the information customization, at least one of addition, information change, and information deletion can be performed. Referring to FIG. 7, a description will be given concerning the customization of the pattern storage device storing screen layout data composed of a display fault area and a display normal area.

The information is customized while being displayed on the liquid crystal panel 7. The customization method differs, depending on whether the driver is driving the vehicle or the vehicle is at a stop (S8 of FIG. 7). If the driver is driving the vehicle, together with information on the speed, fuel, navigator, etc. displayed on the liquid crystal panel 7, a menu for selecting a database (pattern storage device, importance level rank storage device, first table, or second table) to be customized is displayed on the liquid crystal panel 7 (S9-2 of FIG. 7). If the vehicle is at a stop, a menu for selecting a database to be customized is displayed on the entire screen of the liquid crystal panel 7 (S9-1 of FIG. 7).

The selection of the database displayed on the liquid crystal panel 7 is made by the input device 53 as an interface formed of at least one of a touch panel, operation key, joystick, trackball, and a sound. When the database has been selected by the input device 53, a DB selection signal indicating the selection of the database is outputted from the input device 53 to the display data generation section 50.

If the database displayed on the liquid crystal panel 7 is not to be changed, a subsequent flow can be canceled. Selecting the cancellation results in a return to the entire screen display of display data composed of the information on the speed, fuel, navigator, etc. (S10 of FIG. 7).

The display data generation section 50 generates and outputs display data for the purpose of displaying, on the liquid crystal panel 7, a method of customization to be performed on the selected database. If the pattern storage device is selected as the database to be customized, the screen layout data stored in the pattern storage device and the method of customizing the screen layout data stored in the pattern storage device are displayed on the liquid crystal panel 7. As the method of customization, information addition, information change, and information deletion are displayed (S11 of FIG. 7).

The customization method is selected by the input device 53. When the customization method has been selected by the input device 53, a customization selection signal indicating the selection of the customization method is outputted from the input device 53 to the display data generation section 50.

If the screen layout data displayed on the liquid crystal panel 7 is not to be customized, the subsequent flow can be canceled. Selecting the cancellation results in a return to the entire screen display of the display data composed of the information on the speed, fuel, navigator, etc. If any other customization method is to be selected or if a wrong customization method has been selected, the flow can be returned to the menu selection in S10. In this case, on the liquid crystal panel 7, the screen layout data stored in the pattern storage device and the method of customizing the screen layout data are displayed again (S11 of FIG. 7).

If the information deletion is selected as the customization method, the information selected on the liquid crystal panel 7 is deleted from inside the pattern storage device and the information, excluding the deleted information, stored in the pattern storage device is displayed on the liquid crystal panel 7.

If the information change is selected as the customization method, the screen layout data composed of a display fault area and a normal display area as the information selected on the liquid crystal panel 7 can be changed. By the input device 53, the display fault area is changed so that the screen layout data becomes in accordance with the display state of the liquid crystal panel 7. The results of change are recorded so as to be overwritten on the original data in the pattern storage device, and information, including the changed screen layout data, in the pattern storage device is displayed on the liquid crystal panel 7.

If the information addition is selected as the customization method, screen layout data newly created by using the input device 53 or screen layout data obtained by changing the screen layout data stored in the pattern storage device is added to the pattern storage device. Upon completion of the addition to the pattern storage device, the information including the added screen layout data is displayed on the liquid crystal panel 7 (S13 and S14 of FIG. 7). Upon the completion of the customization, the processing returns to the entire screen display of the display data composed of the information on the speed, fuel, navigator, etc.

Customization of the Importance Level Rank Storage Device

Referring to FIG. 7, a description will be given concerning the customization of the importance level rank storage device storing importance level ranks of image data. The customization is performed while being displayed on the liquid crystal panel 7. If the driver is driving the vehicle, together with the information on the speed, fuel, navigator, etc., a menu for selecting a database (any of the pattern storage device, importance level rank storage device, first table, and second table) to be customized is displayed. If the vehicle is stopped, a menu for selecting the database to be customized is displayed on the entire screen of the liquid crystal panel 7 (S8 and S9 of FIG. 7).

The selection of the database displayed on the liquid crystal panel 7 is made via the input device 53. When the database has been selected by the input device 53, a DB selection signal indicating the selection of the database is outputted from the input device 53 to the display data generation section 50.

If the database displayed on the liquid crystal panel 7 is not to be changed, the subsequent flow can be canceled. Selecting the cancellation results in a return to the entire screen display of the display data composed of the information on the speed, fuel, navigator, etc (S10 of FIG. 7).

The display data generation section 50 generates and outputs display data for the purpose of displaying, on the liquid crystal panel 7, a method of customization performed on the selected database. If the importance level rank storage device is selected as the database to be customized, image data (for example, image data on the speed, fuel, navigator, etc.) for each importance level rank stored in the importance level rank storage device and the method of customizing the importance level rank of the image data are displayed on the liquid crystal panel 7. As the method of customization, information addition, information change, and information deletion are displayed (S11 of FIG. 7).

The image data to be customized and the method of customizing the importance level rank of the image data are selected by the input device 53. When the customization method has been selected by the input device 53, a customization selection signal indicating the selection of the customization method is outputted from the input device 53 to the display data generation section 50.

If the importance level rank of the image data displayed on the liquid crystal panel 7 is not to be customized, the subsequent flow can be canceled. Selecting the cancellation results in a return to the entire screen display of the display data composed of the information on the speed, fuel, navigator, etc.

If any other customization method is to be selected or if a wrong customization method has been selected, the flow can be returned to the menu selection in S10. In this case, on the liquid crystal panel 7, the image data for each importance level rank stored in the importance level rank storage device and the method of customizing the importance level rank of the image data are displayed again (S11 of FIG. 7).

If the information deletion is selected as the customization method, contents stored in the importance level rank storage device, that is, which data is assigned with which importance level rank, are displayed on the liquid crystal panel 7. This display displays type of image data included in each importance level rank in a name indicating the image data or in an icon that permits imaging of it. Then, when the name or icon corresponding to the image data to be deleted is selected, the name or icon corresponding to this image data is deleted from the importance level ranks. Then the contents stored in the importance level rank storage device are overwritten with the deletion reflected thereon. Then the information, excluding the image data at the deleted importance level rank, stored in the importance level rank storage device are displayed on the liquid crystal panel 7.

If the change of the importance level rank of the image data is selected as the customization method, the importance level rank of the image data selected on the liquid crystal panel 7 can be changed. By the input device 53, the current importance level rank of the image data can be changed to a higher or lower rank, and further the importance level at the current rank can be changed to a higher or lower importance level. The results of change are stored into the importance level rank storage device, and the information, including the changed importance level rank of the image data, in the importance level rank storage device are displayed on the liquid crystal panel 7.

If the information addition is selected as the customization method, new image data and the importance level rank of this image data can be added by using the input device 53. The importance level rank storage device has two types classified into importance level ranks and importance-level-unset ranks. The importance level ranks are set for image data that can be displayed on the liquid crystal panel 7, while the importance-level-unset ranks are set for image data not provided with importance level ranks, i.e., not displayed on the liquid crystal panel 7. Pieces of the image data respectively corresponding to the importance level ranks and the importance-level-unset ranks are stored in the importance level rank storage device.

For the image data at the importance-level-unset ranks, new importance level ranks can be set. For example, if external information, such as weather forecast, received through the vehicle's communication with the outside is selected as image data to be displayed on the liquid crystal panel 7 and also an importance level rank is set, they are stored as new information into the importance level rank storage device.

Information on the importance level rank including the added image data is displayed on the liquid crystal panel 7 (S13 and s14 of FIG. 7). Upon the completion of the customization, the processing returns to the entire screen display of the display data composed of the information on the speed, fuel, navigator, etc.

Customization of a Smallest Visible Size

Referring to FIG. 7, a description will be given concerning the customization of the first table storing minimum smallest visible sizes of image data. The customization is performed while being displayed on the liquid crystal panel 7. If the driver is driving the vehicle, together with the information on the speed, fuel, navigator, etc., a menu for selecting a database (any of pattern storage device, importance level rank storage device, first table, and second table) to be customized is displayed. If the vehicle is at a stop, a menu for selecting the database to be customized is displayed on the entire screen of the liquid crystal panel 7 (S8 and S9 of FIG. 7).

The selection of the database displayed on the liquid crystal panel 7 is made via the input device 53. When the database has been selected by the input device 53, a DB selection signal indicating the selection of the database is outputted from the input device 53 to the display data generation section 50.

If the database displayed on the liquid crystal panel 7 is not to be changed, the subsequent flow can be canceled. Selecting the cancellation results in a return to the entire screen display of the display data composed of the information on the speed, fuel, navigator, etc (S10 of FIG. 7).

The display data generation section 50 generates and outputs display data for the purpose of displaying, on the liquid crystal panel 7, a method of customization performed on the selected database. If the first table is selected as the database to be customized, a method of customizing information on the smallest visible image size of image data stored in the first table is displayed on the liquid crystal panel 7. As the method of customization, information addition, information change, and information deletion are displayed (S11 of FIG. 7).

The method of customizing the information on the smallest visible size of image data is selected by the input device 53. When the customization method has been selected by the input device 53, a customization selection signal indicating the selection of the customization method is outputted from the input device 53 to the display data generation section 50.

If the information on the smallest visible size of image data is not to be customized, the subsequent flow can be canceled. Selecting the cancellation results in a return to the entire screen display of the display data composed of the information on the speed, fuel, navigator, etc. If any other customization method is to be selected or if a wrong customization method has been selected, the flow can be returned to the menu selection in S10. In this case, on the liquid crystal panel 7, the method of customizing the information on the smallest visible size of image data is displayed again (S11 of FIG. 7).

If the information deletion is selected as the customization method, the information on the smallest visible size of image data, which information has been selected on the liquid crystal panel 7, is deleted from the first table, and also the information, excluding the deleted information on the smallest visible size of image data, stored in the first table is displayed on the liquid crystal panel 7.

If the change of the information on the smallest visible size of image data is selected as the customization method, the smallest visible size of image data selected on the liquid crystal panel 7 can be changed. The smallest size of image data is changed by using the input device 53, while the corresponding image data is displayed on the liquid crystal panel 7. The results of the change in the smallest size are stored into the first table, and information, including the changed smallest visible size of image data, in the first table is displayed on the liquid crystal panel 7.

If the information addition is selected as the customization method, a new smallest visible size of image data can be added by using the input device 53. The first table stores image data with smallest visible sizes set and image data with no smallest visible sizes set, and a smallest visible size can be set for the image data with no smallest visible size set. For example, when external information, such as weather forecast, received through the vehicle's communication with the outside is selected as image data to be displayed on the liquid crystal panel 7 and also the smallest visible size is set, they are stored as new information into the first table. The information including the stored information on the smallest visible size of image data is displayed on the liquid crystal panel 7 (S13 and S14 in FIG. 7).

Upon completion of the customization, the processing returns to the entire screen display of the display data composed of the information on the speed, fuel, navigator, etc.

Customization of Visible Vertical and Horizontal Deformation Ratios

Referring to FIG. 7, a description will be given concerning the customization of the second table storing visible vertical and horizontal deformation ratios of image data. The customization is performed while being displayed on the liquid crystal panel 7. If the driver is driving the vehicle, together with the information on the speed, fuel, navigator, etc., a menu for selecting a database (any of the pattern storage device, importance level rank storage device, first table, and second table) to be customized is displayed. If the vehicle is at a stop, a menu for selecting the database to be customized is displayed on the entire screen of the liquid crystal panel 7 (S8 and S9 of FIG. 7).

The selection of the database displayed on the liquid crystal panel 7 is made via the input device 53. When the database has been selected by the input device 53, a DB selection signal indicating the selection of the database is outputted from the input device 53 to the display data generation section 50.

If the database displayed on the liquid crystal panel 7 is not to be changed, the subsequent flow can be canceled. Selecting the cancellation results in a return to the entire screen display of the display data composed of the information on the speed, fuel, navigator, etc. (S10 of FIG. 7).

The display data generation section 50 generates and outputs display data for the purpose of displaying, on the liquid crystal panel 7, a method of customization performed on the selected database. If the second table is selected as the database to be customized, the method of customizing the visible vertical and horizontal deformation ratios of image data stored in the second table is displayed on the liquid crystal panel 7. As the method of customization, information addition, information change, and information deletion are displayed (S11 of FIG. 7).

The method of customizing information on the visible vertical and horizontal deformation ratios of image data is selected by the input device 53. When the customization method has been selected by the input device 53, a customization selection signal indicating the selection of the customization method is outputted from the input device 53 to the display data generation section 50.

If the information on the visible vertical and horizontal deformation ratios of image data is not to be customized, the subsequent flow can be canceled. Selecting the cancellation results in a return to the entire screen display of the display data composed of the information on the speed, fuel, navigator, etc. If any other customization method is to be selected or if a wrong customization method has been selected, the flow can be returned to the menu selection in S10. In this case, on the liquid crystal panel 7, the method of customizing the information on the visible vertical and horizontal deformation ratios of image data is displayed again (S11 of FIG. 7).

If the information deletion is selected as the customization method, the information on the visible vertical and horizontal deformation ratios of image data, which information has been selected on the liquid crystal panel 7, is deleted from the second table, and also information, excluding the information on the visible vertical and horizontal deformation ratios of image data, stored in the second table is displayed on the liquid crystal panel 7.

If the change of the information on the visible vertical and horizontal deformation ratios of image data is selected as the customization method, the visible vertical and horizontal deformation ratios of image data selected on the liquid crystal panel 7 can be changed. The vertical and horizontal deformation ratios of image data is changed by using the input device 53, while the corresponding image data is displayed on the liquid crystal panel 7. The results of change are stored into the second table, and information, including the changed visible vertical and horizontal deformation ratios of image data, in the second table is displayed on the liquid crystal panel 7.

If the information addition is selected as the customization method, new visible vertical and horizontal deformation ratios of image data can be added by using the input device 53. The second table stores image data with visible vertical and horizontal deformation ratios set and image data with no visible vertical and horizontal deformation ratios set, and visible vertical and horizontal deformation ratios can be set for the image data with no visible vertical and horizontal deformation ratios set.

For example, when external information, such as weather forecast, received through the vehicle's communication with the outside is selected as image data to be displayed on the liquid crystal panel 7 and also the visible vertical and horizontal deformation ratios are set, they are stored as new information into the second table. The information including the stored information on the visible vertical and horizontal deformation ratios of image data is displayed on the liquid crystal panel 7 (S13 and S14 in FIG. 7).

Upon completion of the customization, the processing returns to the entire screen display of the display data composed of the information on the speed, fuel, navigator, etc.

Results of the customization described above are reflected on a user storage area (not shown) in the screen layout table 52. This user storage area may be provided in each of databases, or may be provided, as a user storage area shared by all the databases, in the screen layout table 52.

The processing steps performed by the instrument panel display system described above are realized by executing programs stored in storage devices such as a ROM or RAM and communication controllers, such as an interface circuit, or the input device 53 and output devices such as the liquid crystal panel 7 shown in FIG. 2 by a processor such as a CPU, not shown. Therefore, the various functions and various processing of the instrument panel display system of this preferred embodiment can be realized simply by reading the information recording medium 54 storing the program described above and executing the program by a microcomputer having the aforementioned devices and elements. Moreover, recording the program described above into a reversible recording medium permits achieving the various functions and various processing described above on any computer.

As this recording medium, a memory device, for example, a ROM or the like, may be a program medium for the processing performed on the microcomputer, or a program reading device may be provided as an external storage device, although not shown, and a recording medium may be inserted therein to thereby provide a program medium.

In either case, it is preferable that a program stored be executed by being accessed by the microcomputer. Further, it is preferable that a program be in a mode such that it is read, downloaded in a program recording area of a microcomputer, and then executed. Note that this program to be downloaded is previously stored in the main body device.

As the program medium described above, there are recording mediums that can be formed separately from the main body: for example, recording mediums holding programs in a fixed manner, including: tape types such as a magnetic tape and cassette tape; disc types such as magnetic discs, for example, a flexible disc and hard disc, and discs, for example, a CD, MO, MD, and DVD; card types such as an IC card (including a memory card); or semiconductor memories such as a mask ROM, EPROM (Erasable Programmable Read Only Memory), EPROM (Electrically Erasable Programmable Read Only Memory), and flash ROM.

For a system configuration connectable to a communication network including the Internet, it is preferable that a recording medium hold a program in a mobile manner so that the program is downloaded from the communication network.

Further, to download a program from the communication network in this manner, it is preferable that this program to be downloaded be previously stored in the main body device or installed from another recording medium.

The present invention is not limited to the preferred embodiments described above, and various modifications can be made thereto within the scope of claims presented, and preferred embodiments provided by appropriately combining together technical elements, features and devices disclosed in the aforementioned preferred embodiment is also included in technical range of the present invention.

According to preferred embodiments of the present invention, in the event of a fault in one portion of a display area, information displayed in the area with this fault can be displayed in a normal display area of the same display device, which permits achieving fail safe with a display. Moreover, since displaying continues in the normal display area, the information can be displayed at a position that is more visible to the driver as compared to a case where it is displayed on a completely different display.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display system comprising:

a display disposed in a vehicle;

a controller arranged and programmed to perform control so as to display, as an image on the display, a plurality of pieces of information including information about the vehicle;

a first table arranged to store information on a smallest visible image size when the plurality of pieces of information including the information about the vehicle are displayed as an image; and a second table arranged to store at least one or more sets of vertical and horizontal deformation ratios for the image; wherein the controller is arranged and programmed to perform control so that, in an event of a display fault in a portion of the display, information displayed in a display fault area with the display fault is deformed by the controller based on the first and second tables and is displayed in a normal display area where normal display is performed.

2. The display system according to claim 1, further comprising:

a pattern storage device arranged to store a plurality of pieces of screen layout data indicating in what layout the plurality of pieces of information, including the information about the vehicle, are displayed on the display; wherein the image output control section is further arranged to generate display data to be displayed on the display; based on the screen layout data and the image.

3. The display system according to claim 1, further comprising an importance level rank storage device arranged to store importance levels for at least two of the plurality of pieces of information including the information about the vehicle, and an image output control section arranged to perform control, based on ranks stored in the importance level rank storage device, so as to adjust the information to be displayed and display the information in the normal display area.

4. The display system according to claim 1 wherein when the plurality of pieces of information including the information about the vehicle are displayed as an image in an image size equal to or smaller than the image size stored in the first table, the image output control section is arranged to display the information with numerical values or characters.

5. The display system according to claim 1, further comprising a detector arranged to detect a condition of the display fault area.

6. The display system according to claim 1, further comprising an input device arranged to input the display fault area.

7. The display system according to claim 2, further comprising an input device arranged to perform at least one of:

adding screen layout data to the pattern storage device;

changing the screen layout data stored in the pattern storage device; and deleting the screen layout data stored in the pattern storage device.

8. The display system according to claim 3, further comprising an input device arranged to perform at least one of:

adding an importance level to the importance level rank storage device;

changing the importance level stored in the importance level rank storage device; and deleting the importance level stored in the importance level rank storage device.

9. The display system according to claim 1, further comprising an input device perform at least one of:

adding information on a smallest visible image size to the first table;

changing the information on a smallest visible image size stored in the first table; and deleting the information on a smallest visible image size stored in the first table.

10. The display system according to claim 1, further comprising an input device arranged to perform at least one of:

adding vertical and horizontal deformation ratios to the second table;

changing the vertical and horizontal deformation ratios stored in the second table; and deleting the vertical and horizontal deformation ratios stored in the second table.

11. A tangible computer-readable storage medium storing a display program that when executed on a computer included in a display system according to claim 1, causes the computer to perform the following steps:

a step of performing control by the controller so as to display, as an image on the display, the plurality of pieces of information including the information on the vehicle; and a step of displaying, on the display, display data generated by the step of performing control.

12. A display method performed by the display system according to claim 1, the display method comprising:

a step of performing control by the controller so as to display, as an image on the display, the plurality of pieces of information including the information on the vehicle; and a step of displaying, on the display, display data generated by the control step.

13. A display device disposed in a vehicle, comprising:

a display arranged to display, as an image, a plurality of pieces of information including information about the vehicle;

a first table arranged to store information on a smallest visible image size when the plurality of pieces of information including the information about the vehicle are displayed as an image;

a second table arranged to store at least one or more sets of vertical and horizontal deformation ratios for the image;

an image output control section arranged to deform the image to be displayed based on the first and second tables;

a controller arranged and programmed to perform control so that, in an event of a display fault in a portion of the display, information displayed in a display fault area with the display fault is deformed by the image output control section and is displayed in a normal display area where normal display is performed.

* * * * *